United States Patent
Medina

(10) Patent No.: US 12,428,001 B2
(45) Date of Patent: Sep. 30, 2025

(54) COMPREHENSIVE USER CONTROL SYSTEM FOR VEHICLE

(71) Applicant: In Motion Mobility LLC, Miami, FL (US)

(72) Inventor: Edwin Medina, Miami, FL (US)

(73) Assignee: In Motion Mobility LLC, Miami, FL (US)

( * ) Notice: Subject to any disclaimer, the term of this patent is extended or adjusted under 35 U.S.C. 154(b) by 98 days.

(21) Appl. No.: 18/455,207

(22) Filed: Aug. 24, 2023

(65) Prior Publication Data

US 2024/0132079 A1 Apr. 25, 2024
US 2024/0227821 A9 Jul. 11, 2024

Related U.S. Application Data

(63) Continuation-in-part of application No. 17/971,451, filed on Oct. 21, 2022, now Pat. No. 11,919,463.

(51) Int. Cl.
*B60W 50/00* (2006.01)
*B60W 50/02* (2012.01)
*B60W 50/14* (2020.01)

(52) U.S. Cl.
CPC .... *B60W 50/0097* (2013.01); *B60W 50/0205* (2013.01); *B60W 50/14* (2013.01); *B60W 2050/143* (2013.01); *B60W 2050/146* (2013.01); *B60W 2554/406* (2020.02)

(58) Field of Classification Search
CPC ......... B60W 50/0097; B60W 50/0205; B60W 50/14; B60W 2050/143; B60W 2050/146; B60W 2554/406; B60K 2360/1438; B60K 2360/46; B60K 2360/56; B60K 2360/583; B60K 2360/595; B60K 2360/60; B60K 35/10; B60K 35/85
See application file for complete search history.

(56) References Cited

U.S. PATENT DOCUMENTS

| | | | |
|---|---|---|---|
| 10,388,157 B1 * | 8/2019 | Hayes | G08G 1/165 |
| 2014/0279021 A1 | 9/2014 | Macneille et al. | |
| 2014/0281964 A1 * | 9/2014 | Han | G06F 3/04883 715/708 |

(Continued)

OTHER PUBLICATIONS

Final Office Action on U.S. Appl. No. 17/971,451 DTD Jun. 21, 2023.

(Continued)

*Primary Examiner* — Nga X Nguyen
(74) *Attorney, Agent, or Firm* — Foley & Lardner LLP

(57) ABSTRACT

A control system for a vehicle includes a touch screen, a Controller Area Network (CAN) microcontroller, and an embedded computer assembly (ECA). The touch screen is configured to receive a user input. The touch screen is physically mounted directly on either side of a steering wheel of the vehicle. The CAN microcontroller is configured to communicate with a CAN bus of the vehicle. The ECA includes processing circuitry configured to obtain a user input from the touch screen and provide a control signal to the CAN microcontroller and the CAN bus of the vehicle to perform a requested vehicle function according to the user input. The touch screen and the ECA are retrofit on the vehicle and the ECA is configured to intersect, suppress, modify, or reproduce communications on the CAN bus of the vehicle.

20 Claims, 22 Drawing Sheets

(56) References Cited

U.S. PATENT DOCUMENTS

| | | |
|---|---|---|
| 2015/0153936 A1 | 6/2015 | Lim et al. |
| 2015/0378596 A1* | 12/2015 | Gutentag ............ G06F 3/04883 |
| | | 715/719 |
| 2016/0267722 A1 | 9/2016 | Schroeder et al. |
| 2018/0075647 A1 | 3/2018 | Kim et al. |
| 2019/0070963 A1 | 3/2019 | Jang et al. |

OTHER PUBLICATIONS

Non-Final Office Action on U.S. Appl. No. 17/971,451 DTD Feb. 10, 2023.

* cited by examiner

COMPREHENSIVE USER CONTROL SYSTEM FOR VEHICLE

CROSS-REFERENCE TO RELATED PATENT APPLICATION

This application is a continuation-in-part of U.S. application Ser. No. 17/971,451, filed Oct. 21, 2022, the entire disclosure of which is incorporated by reference herein.

BACKGROUND

The present disclosure relates generally to control systems. More particularly, the present disclosure relates to vehicle control systems.

SUMMARY

One implementation of the present disclosure is a control system for a vehicle, according to some embodiments. In some embodiments, the control system includes a touch screen, a function-specific programmable logic controller (PLC), and an embedded computer assembly (ECA). In some embodiments, the touch screen is configured to receive a user input. In some embodiments, the touch screen is physically mounted directly on either side of a steering wheel of the vehicle. In some embodiments, the PLC is configured to communicate with a CAN bus of the vehicle. In some embodiments, the ECA includes processing circuitry configured to obtain a user input from the touch screen and provide a control signal to the PLC and the CAN bus of the vehicle to perform a requested vehicle function according to the user input. In some embodiments, the touch screen and the ECA are retrofit on the vehicle and the ECA is configured to intersect, suppress, modify, or reproduce communications on the CAN bus of the vehicle.

In some embodiments, the touch screen is mounted on either side of the steering wheel to be accessible by an operator of the vehicle with a physical disability. In some embodiments, the touch screen includes a horizontal or vertical curvature to facilitate accessibility by the operator. In some embodiments, the touch screen is straight.

In some embodiments, the control system is a retrofit system configured to provide touch screen control for one or more vehicle functions of the vehicle that are not controlled by a touch screen. In some embodiments, the ECA is configured to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen.

In some embodiments, the control system further includes a microphone configured to obtain the user input as a voice command, and a camera configured to obtain the user input as a detected gesture. In some embodiments, the control system further includes a speaker configured to provide audio feedback to the operator as the operator interacts with the control system.

In some embodiments, the control system further includes a linear actuator operably coupled with a transmission cable of the vehicle. In some embodiments, the ECA is configured to cause the linear actuator to operate to transition between different gears of the vehicle in response to a user input to transition into a different gear, the touch screen configured to display a currently selected gear of the vehicle.

In some embodiments, the ECA is further configured to wirelessly communicate with a personal computer device. In some embodiments, the personal computer device is configured to receive the user input from the operator and wirelessly transmit the user input to the processing circuitry of the ECA. In some embodiments, the control system further includes a vehicle Local Interconnect Network (LIN) controller. In some embodiments, the vehicle LIN controller configured to intersect serial communications of a LIN bus of the vehicle to perform the requested vehicle function.

Another implementation of the present disclosure is a vehicle, according to some embodiments. In some embodiments, the vehicle includes a Controller Area Network (CAN) bus, a Local Interconnect Network (LIN) bus, and a control system for controlling functions of the vehicle. In some embodiments, the control system includes a touch screen, a CAN microcontroller, a LIN controller, and an embedded computer assembly (ECA). In some embodiments, the touch screen is configured to receive a user input. In some embodiments, the touch screen is physically mounted directly on one side of a steering wheel of the vehicle. In some embodiments, the CAN microcontroller is configured to communicate with the CAN bus of the vehicle. In some embodiments, the LIN controller is configured to communicate with the LIN bus of the vehicle. In some embodiments, the ECA includes processing circuitry configured to obtain the user input from the touch screen, and provide a control signal to the CAN bus and the LIN bus via the CAN microcontroller and the LIN controller to perform a requested vehicle function according to the user input. In some embodiments, the touch screen and the ECA are retrofit on the vehicle and the ECA is configured to intersect, suppress, modify, or reproduce communications on the CAN bus of the vehicle.

In some embodiments, the touch screen is mounted on the one side of the steering wheel to be accessible by an operator of the vehicle with a physical disability. In some embodiments, the touch screen includes a horizontal or vertical curvature to facilitate accessibility by the operator.

In some embodiments, the control system is a retrofit system configured to provide touch screen control for one or more vehicle functions of the vehicle that are not controlled by a touch screen. In some embodiments, the ECA is configured to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen.

In some embodiments, the ECA further includes a microphone configured to obtain the user input as a voice command, and a camera configured to obtain the user input as a detected gesture. In some embodiments, the ECA further includes a speaker configured to provide audio feedback to the operator as the operator interacts with the control system.

In some embodiments, the control system further includes a linear actuator operably coupled with a transmission cable of the vehicle. In some embodiments, the ECA is configured to cause the linear actuator to operate to transition between different gears of the vehicle in response to a user input to transition into a different gear. In some embodiments, the touch screen is configured to display a currently selected gear of the vehicle.

In some embodiments, the ECA is further configured to wirelessly communicate with a personal computer device. In some embodiments, the personal computer device is configured to receive the user input from the operator and wirelessly transmit the user input to the processing circuitry of the ECA.

Another implementation of the present disclosure is a method for controlling operation of one or more features of a vehicle, according to some embodiments. In some embodiments, the method includes retrofitting a vehicle with a control unit comprising a touch screen display and an embedded computer assembly (ECA). In some embodiments, the ECA is configured to control communications on a Controller Area Network (CAN) bus of the vehicle. In some embodiments, the method includes obtaining, at the touch screen display, a user input to control a function of the vehicle. In some embodiments, the touch screen display is positioned on a mount next to a steering wheel of the vehicle and accessible to an operator of the vehicle with impaired fine motor skills. In some embodiments, the method includes controlling, by the ECA and communications on the CAN bus of the vehicle, a controllable element of the vehicle to perform the function of the vehicle requested by the user input.

In some embodiments, the ECA is configured to control communications on the CAN bus of the vehicle to control at least lighting, turn indicators, a horn, rolling operations of windows, wiper operations, air conditioning operations, parking brake activation, gear shifting, power doors, power mirrors, door locks, cruise control, and radio or infotainment of the vehicle responsive to user inputs received at the touch screen. In some embodiments, the method further includes receiving, via a microphone or a camera of the control unit, another user input to control the function of the vehicle, the user input comprising a spoken command or a gesture, and controlling, by the ECA and communications on the CAN bus of the vehicle, the controllable element of the vehicle to perform the function of the vehicle requested by the spoken command or the gesture. In some embodiments, the function of the vehicle includes any of the lighting, the turn indicators, the horn, the rolling operations of windows, the wiper operations, the air conditioning operations, the parking brake activation, the gear shifting, the power doors, the power mirrors, the door locks, the cruise control, or the radio or infotainment operations of the vehicle responsive to user inputs received at the touch screen.

Another implementation of the present disclosure is a retrofit control system for a vehicle, according to some embodiments. In some embodiments, the retrofit control system includes a display screen, a function-specific programmable logic controller (PLC), and an embedded computer assembly (ECA). In some embodiments, the display screen is retrofit on the vehicle and is configured to display an output. In some embodiments, the function-specific programmable logic controller (PLC) is configured to communicate with a Controller Area Network (CAN) bus of the vehicle. In some embodiments, the embedded computer assembly (ECA) is retrofit on the vehicle and includes processing circuitry. In some embodiments, the processing circuitry is configured to obtain one or more inputs from at least one pre-retrofit device or sensor and at least one retrofit device or sensor. In some embodiments, the processing circuitry is configured to determine, based on the one or more inputs and using an artificial intelligence (AI), a customized output for a user of the vehicle. In some embodiments, the processing circuitry is configured to operate one or more pre-retrofit devices or retrofit devices of the vehicle according to the customized output. In some embodiments, the ECA is configured to suppress communications on the CAN bus from a pre-retrofit component and generate new communications on the CAN bus to at least partially operate the one or more pre-retrofit devices of the vehicle according to the customized output.

In some embodiments, the customized output includes a suggested vehicle setting including a suggested temperature setting for an interior of the vehicle, a suggested position of a seat of the vehicle, or a suggested suspension setting of the vehicle. In some embodiments, the suggested vehicle setting is a personalized setting for the user that is determined based on one or more user preferences learned by the AI and determined based on one or more external conditions of the vehicle, the external conditions comprising exterior temperature, exterior humidity, or road quality.

In some embodiments, the customized output includes a navigation recommendation including a suggested route for the user of the vehicle to reach a specific destination. In some embodiments, the navigation recommendation is determined by the AI based on real-time traffic data, road conditions, a current location of the vehicle, and user preferences. In some embodiments, operating the one or more pre-retrofit devices or retrofit devices of the vehicle according to the navigation recommendation includes operating a pre-retrofit or retrofit display screen of the vehicle to display the navigation recommendation.

In some embodiments, the customized output includes a predictive safety alert. In some embodiments, the predictive safety alert is configured to notify the user regarding a potential future hazard including at least one of a braking event of an external vehicle in front of the vehicle, poor road conditions, or upcoming traffic along a route of the vehicle. In some embodiments, the predictive safety alert is determined by the AI based on at least one of construction or road quality data obtained from an external service, or image data obtained from an imaging device of the vehicle. In some embodiments, operating the one or more pre-retrofit devices or retrofit devices of the vehicle according to the navigation recommendation includes operating a pre-retrofit or retrofit display screen or speaker of the vehicle to provide a visual alert or an aural alert.

In some embodiments, the customized output includes an emergency assistance output. In some embodiments, the emergency assistance output includes at least one of an automated action to notify an emergency service, or multiple instructions for the user. In some embodiments, the automated action to notify the emergency service includes establishing communications with the emergency service via a wireless transceiver and reporting a location and status of the vehicle to the emergency service.

In some embodiments, the customized output includes a maintenance recommendation. In some embodiments, the maintenance recommendation includes a suggested maintenance task, a service interval, or an alert to the user regarding a potential malfunction of the vehicle that requires inspection, the maintenance recommendation determined by the AI based on telematics data, historical performance data of the vehicle, and diagnostic information of the vehicle. In some embodiments, operating the one or more pre-retrofit devices or retrofit devices of the vehicle according to the maintenance recommendation includes operating a pre-retrofit or retrofit display screen or speaker of the vehicle to provide a visual alert or an aural alert.

In some embodiments, the retrofit control system includes a microphone and a speaker. In some embodiments, the microphone is configured to obtain audio data of spoken words by the user. In some embodiments, the speaker is configured to operate to provide aural feedback to the user. In some embodiments, the ECA is configured to implement a natural language processor (NLP) to obtain a user input from the user via the microphone according to a spoken modality and operate the speaker to provide feedback to the user according to the spoken modality. In some embodiments, the NLP, the microphone, and the speaker are configured to enable operation of the ECA by the user in a conversational manner to allow hands-free interaction between the user and the ECA.

In some embodiments, the processing circuitry is configured to collect the one or more inputs over a time period. In some embodiments, the processing circuitry is configured to use the collected one or more inputs to tune or train the AI in order to improve a customization of the customized output.

Another implementation of the present disclosure is a method for providing and using an intelligent assistant on a vehicle, according to some embodiments. In some embodiments, the method includes retrofitting a control unit into a vehicle. In some embodiments, the control unit includes an artificial intelligence (AI). In some embodiments, the control unit is configured to obtain input data from one or more pre-retrofit devices of a Controller Area Network (CAN) bus of the vehicle and from one or more pre-retrofit devices of a Local Interconnect Network (LIN) bus of the vehicle. In some embodiments, the method includes obtaining one or more inputs from at least one of the pre-retrofit devices of the CAN bus of the vehicle or the pre-retrofit devices of the LIN bus of the vehicle, and from a retrofit device of the vehicle. In some embodiments, the method includes determining, based on the one or more inputs and using the AI, a customized output for a user of the vehicle. In some embodiments, the method includes operating one or more pre-retrofit devices or retrofit devices of the vehicle according to the customized output. In some embodiments, the control unit is configured to suppress one or more communications on the CAN bus or the LIN bus and generate new communications on the CAN bus or the LIN bus to at least partially operate the one or more pre-retrofit devices of the vehicle according to the customized output.

In some embodiments, the customized output includes a suggested vehicle setting including a suggested temperature setting for an interior of the vehicle, a suggested position of a seat of the vehicle, or a suggested suspension setting of the vehicle. In some embodiments, the suggested vehicle setting is a personalized setting for the user determined based on one or more user preferences learned by the AI and determined based on one or more external conditions of the vehicle, the external conditions comprising exterior temperature, exterior humidity, or road quality.

In some embodiments, the customized output includes a navigation recommendation. In some embodiments, the navigation recommendation includes a suggested route for the user of the vehicle to reach a specific destination. In some embodiments, the navigation recommendation determined by the AI based on real-time traffic data, road conditions, a current location of the vehicle, and user preferences. In some embodiments, operating the one or more pre-retrofit devices or retrofit devices of the vehicle according to the navigation recommendation includes operating a pre-retrofit or retrofit display screen of the vehicle to display the navigation recommendation.

In some embodiments, the customized output includes a predictive safety alert. In some embodiments, the predictive safety alert is configured to notify the user regarding a potential future hazard including at least one of a braking event of an external vehicle in front of the vehicle, poor road conditions, or upcoming traffic along a route of the vehicle.

In some embodiments, the predictive safety alert is determined by the AI based on at least one of construction or road quality data obtained from an external service, or image data obtained from an imaging device of the vehicle. In some embodiments, operating the one or more pre-retrofit devices or retrofit devices of the vehicle according to the navigation recommendation includes operating a pre-retrofit or retrofit display screen or speaker of the vehicle to provide a visual alert or an aural alert.

In some embodiments, the customized output includes an emergency assistance output. In some embodiments, the emergency assistance output includes at least one of an automated action to notify an emergency service, or multiple instructions for the user. In some embodiments, the automated action to notify the emergency service includes establishing communications with the emergency service via a wireless transceiver and reporting a location and status of the vehicle to the emergency service.

In some embodiments, the customized output includes a maintenance recommendation. In some embodiments, the maintenance recommendation includes a suggested maintenance task, a service interval, or an alert to the user regarding a potential malfunction of the vehicle that requires inspection. In some embodiments, the maintenance recommendation is determined by the AI based on telematics data, historical performance data of the vehicle, and diagnostic information of the vehicle. In some embodiments, operating the one or more pre-retrofit devices or retrofit devices of the vehicle according to the maintenance recommendation includes operating a pre-retrofit or retrofit display screen or speaker of the vehicle to provide a visual alert or an aural alert.

In some embodiments, at least one of the one or more inputs are spoken inputs by the user obtained from a microphone. In some embodiments, the method includes using a natural language processor (NLP) to determine a user input as one of the one or more inputs based on data obtained from the microphone.

In some embodiments, the method includes collecting the one or more inputs over a time period. In some embodiments, the method includes using the collected one or more input to tune or train the AI in order to improve a customization of the customized output.

Another implementation of the present disclosure is a retrofit control system for a vehicle, according to some embodiments. In some embodiments, the retrofit control system includes a retrofit button, a function-specific programmable logic controller (PLC), a speaker, and an embedded computer assembly (ECA). In some embodiments, the retrofit button is retrofit to the vehicle and physically positioned within reach of a driver of the vehicle. In some embodiments, the function-specific PLC is configured to communicate with a CAN bus of the vehicle. In some embodiments, the speaker is positioned within the vehicle. In some embodiments, the ECA is retrofit on the vehicle and includes processing circuitry. In some embodiments, the processing circuitry is configured to obtain a first user input from the driver via the retrofit button. In some embodiments, the processing circuitry is configured to, responsive to the first user input, operate the speaker to provide aural feedback to the driver indicating a list of features. In some embodiments, the processing circuitry is configured to obtain a second user input from the driver via the retrofit button during a time period when a desired feature of the list of features is being aurally communicated to the user via the speaker. In some embodiments, the processing circuitry is configured to, responsive to receiving the second user input, provide a control signal to the PLC via the CAN bus of the vehicle to perform a requested vehicle function corresponding to the desired feature according to the second user input by generating new communications on the CAN bus of the vehicle.

In some embodiments, the retrofit button is positioned on a steering wheel of the vehicle. In some embodiments, the list of features include at least two of activation or deactivation of a left indicator, activation or deactivation of a right indicator, activation or deactivation of head lights. activation or deactivation of hazard flashers, activation of a horn, a control of windshield wipers, or a power window adjustment. In some embodiments, the processing circuitry is configured to operate the speaker to sequentially provide aural feedback to the driver indicating the list of features. In some embodiments, the retrofit button is configured to enable the driver of the vehicle to select and operate multiple different functions of the vehicle via actuation of a single button.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the Figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a control system may be retrofit into a vehicle. The control system can include processing circuitry to interrupt, suppress, and/or reproduce communications on one or more communications buses of the vehicle. The control system can also include a touch screen mounted directly on a side of a steering wheel of the vehicle. The control system facilitates obtaining a user input at the touch screen or according to different modalities for controlling various features of the vehicle. Advantageously, the control system facilitates ease of use for physically disabled users who may have decreased fine motor skills.

Control System

Vehicle Overview

Figure 1:
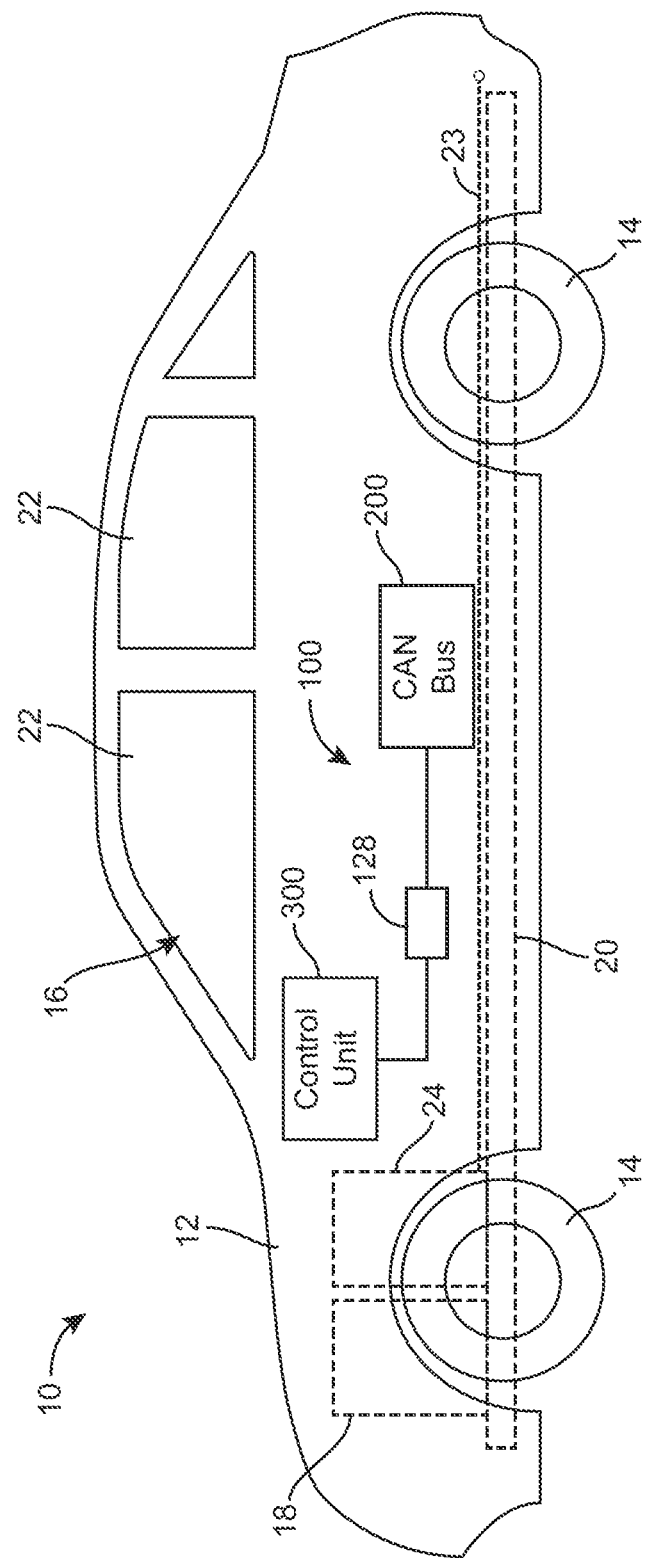
FIG. 1 is a diagram of a vehicle equipped with a retrofit control unit, according to some embodiments.

Referring to FIG. 1, a vehicle 10 (e.g., a car, a limousine, a van, an autonomous vehicle, an electric vehicle, an internal combustion engine vehicle, etc.) includes a body 12 (e.g., a frame, a shell, sidewalls, a compartment, etc.), a primary mover 18 (e.g., an internal combustion engine, an electric motor, a diesel engine, a gasoline engine, a fuel cell, etc.), and tractive elements 14 (e.g., wheels, tires, axle assemblies, wheel assemblies, etc.). The vehicle 10 also includes a chassis 20 (e.g., a frame, a carriage, etc.) configured to provide structural support for the primary mover 18 and the body 12. The body 12 defines an inner volume 16 within which an operator and a control system 100 is positioned. The vehicle 10 also includes a transmission 24 that is configured to receive or obtain mechanical energy (e.g., torque, rotational inertia, rotational energy, etc.) from the primary mover 18 and provides mechanical energy (e.g., torque, rotational inertia, rotational energy, etc.) to the tractive elements 14 of the vehicle 10. The vehicle 10 also includes a control unit 300 that is positioned within the inner volume 16 of the vehicle 10. The control unit 300 may be a unitary control unit or human machine interface (HMI) that is configured to receive user inputs from the operator according to a variety of modalities such as via a touch screen, a voice input, a gesture, etc.) and facilitate control of the vehicle 10 or various functions of the vehicle 10. The body 12 also includes one or more windows 22 (e.g., power windows) that can be rolled up or down by an electric motor. The vehicle 10 also includes a Local Interconnect Network (LIN) 142, illustrated by LIN line 23.

The control unit 300 can be a component of the control system 100 and is configured to communicate (e.g., wiredly) with a Controller Area Network (CAN) flexible data-rate (FD) microcontroller 128 of the control system 100, according to some embodiments. In some embodiments, the CAN FD microcontroller 128 is configured to communicate with a CAN bus 200 of the vehicle 10 (e.g., a CAN FD bus, a classic CAN bus, etc.) to facilitate control of various operations of the vehicle 10. The control unit 300 may be configured to facilitate control of operations of the vehicle 10 that are normally controlled by local switches (e.g., indicator switches, headlights, etc.) via a different modality of user inputs (e.g., a single touch screen, a microphone, a camera, a remote control, a personal computer device, etc.). The control unit 300 facilitates control of accessories or functions of the vehicle 10 that may be difficult for an operator with a physical disability to perform. For example, a person with a physical disability may have decreased fine motor skills resulting in difficulty extending their fingers which may make operating switches (e.g., door switches, indicator switches, etc.) difficult. Advantageously, the control unit 300 facilitates obtaining the user inputs according to different modalities (e.g., at a single touch screen, using voice commands, using a hand held remote control, using gestures, etc.) to facilitate improved control of the functions of the vehicle 10 for operators with decreased fine motor skills.

CAN Bus and Devices

Figure 2A:
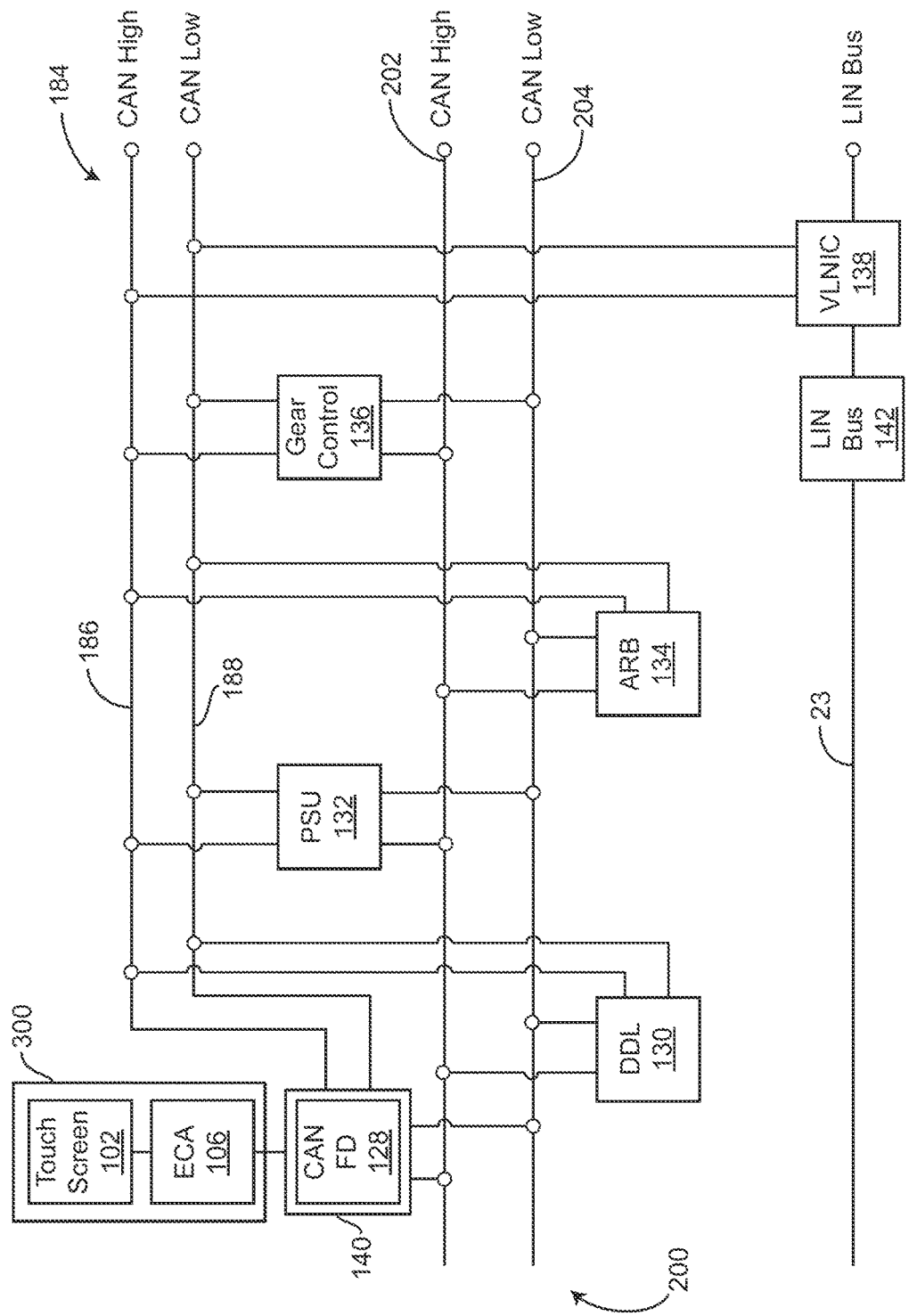
FIGS. 2A-2B are block diagrams of a Controller Area Network (CAN) and Local Interconnect Network (LIN) bus of the vehicle of FIG. 1, according to some embodiments.
Figure 2B:
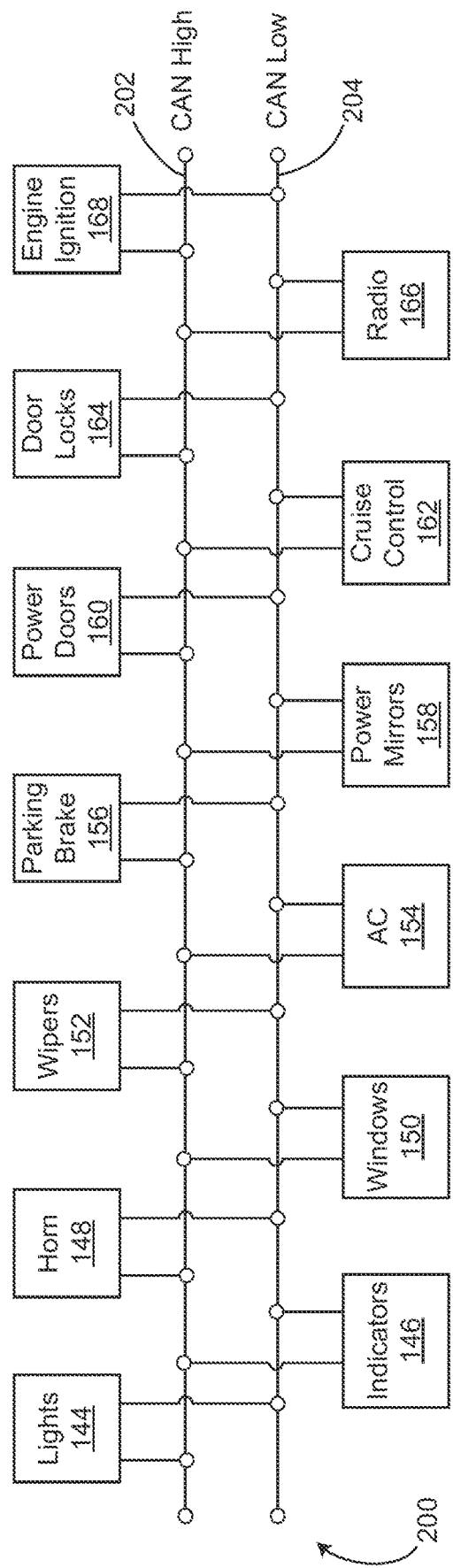

Referring to FIGS. 2A and 2B, the CAN bus 200 of the vehicle 10 is shown, according to some embodiments. The control unit 300 is communicably coupled on the CAN bus 200 through the CAN FD microcontroller 128. The CAN FD microcontroller 128 is configured to communicate on the CAN bus 200 and may interrupt, suppress, modify, or reproduce communications on the CAN bus 200 according to the control unit 300 so that the control unit 300 can control operation of one or more features, functions, accessories, etc., of the vehicle 10.

The control unit 300 includes a touch screen 102 (e.g., a capacitive touch screen, a display screen, a user input device, etc.) and an embedded computer assembly (ECA) 106, according to some embodiments. In some embodiments, the ECA 106 is configured to control operation of various peripheral devices (e.g., controllable elements), or controllers (e.g., programmable logic controllers (PLC) such as the VLNIC 138 or the VCNIC 140) that are communicably coupled with the CAN bus 200, or with a LIN bus 142. The ECA 106 communicates with the peripheral devices or controllers of the CAN bus 200 or the LIN bus 142 via the CAN FD microcontroller 128 and/or a vehicle LIN network interface controller (VLNIC) 138 (e.g., a vehicle LIN controller). The ECA 106 can, similarly to the CAN bus 200, intersect, suppress, and/or reproduce communications on the LIN bus 142 via the VLNIC 138 so that the ECA 106 can control operation of various functions, features, accessories, microcontrollers, operations, etc., of the vehicle 10 that communicate on the LIN bus 142 instead of the CAN bus 200.

In some embodiments, the VCNIC 140 is a programmable logic controller that implements or includes the CAN FD microcontroller 128. The VCNIC 140 may be communicably coupled with the ECA 106. In some embodiments, the VCNIC 140 is communicably coupled with both a CAN bus 184 and the CAN bus 200. In some embodiments, the VCNIC 140 is an electronic module that is deployed to control secondary functions of the vehicle 10 that are located on the CAN bus 200 (e.g., responsive to commands from the ECA 106).

The VLNIC 138 may be an electric module or a function specific programmable logic controller that is deployed to control secondary functions of the vehicle 10 that are located within the LIN bus 142. The VLNIC 138 may be controlled by the ECA 106 to intersect serial communications on the LIN bus 142 and reproducing, modifying, or suppressing any desired message on the LIN bus 142. In some embodiments, the VLNIC 138 includes a LIN capable microcontroller configured to bridge communications between the CAN bus 200 and/or the ECA 106 (e.g., the control unit 300) with serial network protocols that are used for communications between components of the vehicle 10. In some embodiments, the VLNIC 138 includes a clock extension peripheral interface (CXPI) chip that enables the ECA 106 or the control unit 300 to be compatible with modern automotive electronic control units (ECU) that use focused low-speed single wire network control applications such as heating, ventilation, or air-conditioning.

Referring still to FIGS. 2A and 2B, the ECA 106 is configured to communicate with and control one or more peripheral devices including a digital data logger (DDL) 130, a power supply unit (PSU) 132, an accessory relay box (ARB) 134, a gear control system 136, the VLNIC 138, and a Vehicle CAN Network Interface Controller (VCNIC) 140, according to some embodiments. In some embodiments, the VCNIC 140 is a programmable logic controller (e.g., a function-specific programmable logic controller) including the CAN FD microcontroller 128 (e.g., the CAN FD microcontroller 128 is a component of, or is implemented on, the VCNIC 140). In some embodiments, the control system 100 includes the separate CAN bus 184 (e.g., including a CAN high line 186 and a CAN low line 188) to communicate with one or more peripheral devices (e.g., the PSU 132, the DDL 130, the ARB 134, the gear control system 136, the VLNIC 138, etc.). In some embodiments, one or more of the peripheral devices are communicably coupled with both the CAN bus 184 and the CAN bus 200. For example, the ECA 106 may communicate with the peripheral devices (e.g., the DDL 130, the PSU 132, the ARB 134, the gear control system 136, etc.) which in turn communicate with other devices on the CAN bus 200.

The ECA 106 may function as a central processing unit that hosts the functionality of the control system 100 and connects and controls all peripheral devices (e.g., the DDL 130, the CAN FD microcontroller 128, the PSU 132, the ARB 134, the gear control system 136, the VLNIC 138, the VCNIC 140, etc.). The ECA 106 may use inputs from the touch screen 102 or the other modalities described herein to control the peripheral devices, or to control functionality of the vehicle 10 as described herein. The ECA 106 may be communicably coupled with the peripheral devices described herein via the CAN bus 200, or may be directly communicably coupled with the peripheral devices (e.g., wiredly or wirelessly).

The DDL 130 is a module or device (e.g., circuit, processing circuitry, controller, processor, microcontroller, etc.) that is configured to measure and record information communicated on the CAN bus 200 during different periods, according to some embodiments. In some embodiments, the DDL 130 reports any of the measured or recorded information to the ECA 106 (e.g., via the CAN bus 200) so that the ECA 106 can store and upload the recorded information. The DDL 130 can provide information that is comprehensive of conditions being monitored. The DDL 130 can include a real time clock (RTTC), a secure digital (SD) card, and a battery (e.g., an energy storage device). The DDL 130 may provide the recorded information to the ECA 106 for analysis, diagnostics, and/or improvement of the control system 100.

The PSU 132 is a module or unit (e.g., an electrical device) that is configured to supply and manage electrical consumption of the control system 100, or more generally, the vehicle 10, according to some embodiments. In some embodiments, the PSU 132 is configured to monitor internal serial communication activity of the vehicle 10 to activate elements of the vehicle 10 (e.g., controllers, peripheral devices, features, functionality, etc.) when the vehicle 10 is awake, or to deactivate the elements of the vehicle 10 when the vehicle 10 is dormant (e.g., in order to conserve power consumption of the elements, systems, sub-systems, modules, controllers, etc., of the vehicle 10). The PSU 132 may include a Zigbee chip or module in addition to or in place a Zigbee chip or module of the ECA 106. In some embodiments, the PSU 132 is configured to communicate with the ECA 106 or a personal computer device via Zigbee. For example, the ECA 106 can coordinate control of the PSU 132 or obtain analytics (e.g., monitored data) from the PSU 132.

The ARB 134 may be configured to control various systems, sub-systems, features, controls, operations, etc., of the vehicle 10 that require an analog input, according to some embodiments. In some embodiments, the ARB 134 works in combination with the VLNIC 138 and the VCNIC 140 so that analog elements, elements on the CAN bus 200, and elements on the LIN bus 142 can be controlled.

Referring to FIGS. 2A-2B, and 12-13, the gear control system 136 is configured to receive communications or controls via the CAN bus 200 (e.g., controlled by the ECA 106) and transition the transmission 24 between different gears according to the received communications. In some embodiments, the gear control system 136 includes an electronic controller 1202, a stepper motor 1204 (e.g., an electric motor), optical sensors 1208, a linear actuator 1206 (e.g., a linear guide stage actuator), and one or more brackets 1216 to mount the linear actuator 1206. The gear control system 136 may convert a vehicle with a manual gear selector lever (e.g., a shifter) into an electronic gear control system. The controller 1202 can receive communications from the ECA 106 via the CAN bus 200 (e.g., a command to transition the transmission 24 between different gears such as park, reverse, neutral, drive, etc.). In response to receiving communications from the ECA 106 to change the gear of the transmission 24, the controller 1202 generates control signal for the stepper motor 1204 and operates the stepper motor 1204 to drive an output driveshaft 1210. The output driveshaft 1210 (e.g., a shaft) is rotatably coupled with a screw 1212 (e.g., a rotatable drive member) of the linear actuator 1206 so that when the stepper motor 1204 is operated, the screw 1212 of the linear actuator 1206 is driven to translate a follower 1218 (e.g., a block) that slidably couples with a track. The linear actuator 1206 is coupled with a shifting cable 1214 of the transmission 24 and can be adjusted (e.g., translated) by the stepper motor 1204, the linear actuator 1206 and the controller 1202 responsive to control commands from the ECA 106 to thereby transition the transmission 24 between different gears.

In some embodiments, the transmission 24 is communicably coupled on the CAN bus 200 and can provide feedback such as a message indicating selected gear to the CAN bus 200 (e.g., to the ECA 106). In some embodiments, the transmission 24 is communicably coupled with the ECA 106 via the CAN bus 200 and/or the LIN bus 142. The ECA 106 and/or the controller 1202 of the gear control system 136 can be configured to use the feedback from the transmission 24 to identify which gear is currently selected, and to start or stop operation of the stepper motor 1204 to transition the transmission 24 into a desired gear.

In some embodiments, the optical sensor(s) 1208 are configured to measure the position of the cable 1214 or the linear actuator 1206 and provide sensor feedback to the controller 1202. In some embodiments, the controller 1202 uses the sensor feedback provided by the optical sensor(s) 1208 to monitor a currently selected gear of the transmission 24 and to determine when the stepper motor 1204 should be started or stopped to transition the transmission 24 into a desired gear. The controller 1202 may provide voltage to the stepper motor 1204 until the controller 1202 obtains feedback from the transmission 24 or the optical sensor(s) 1208 indicating that the transmission 24 is transitioned into the desired gear. In some embodiments, the optical sensors 1208 are configured to measure a distance between a fixed location on the bracket 1216 or on the linear actuator 1206 and the follower 1218.

Figure 12:
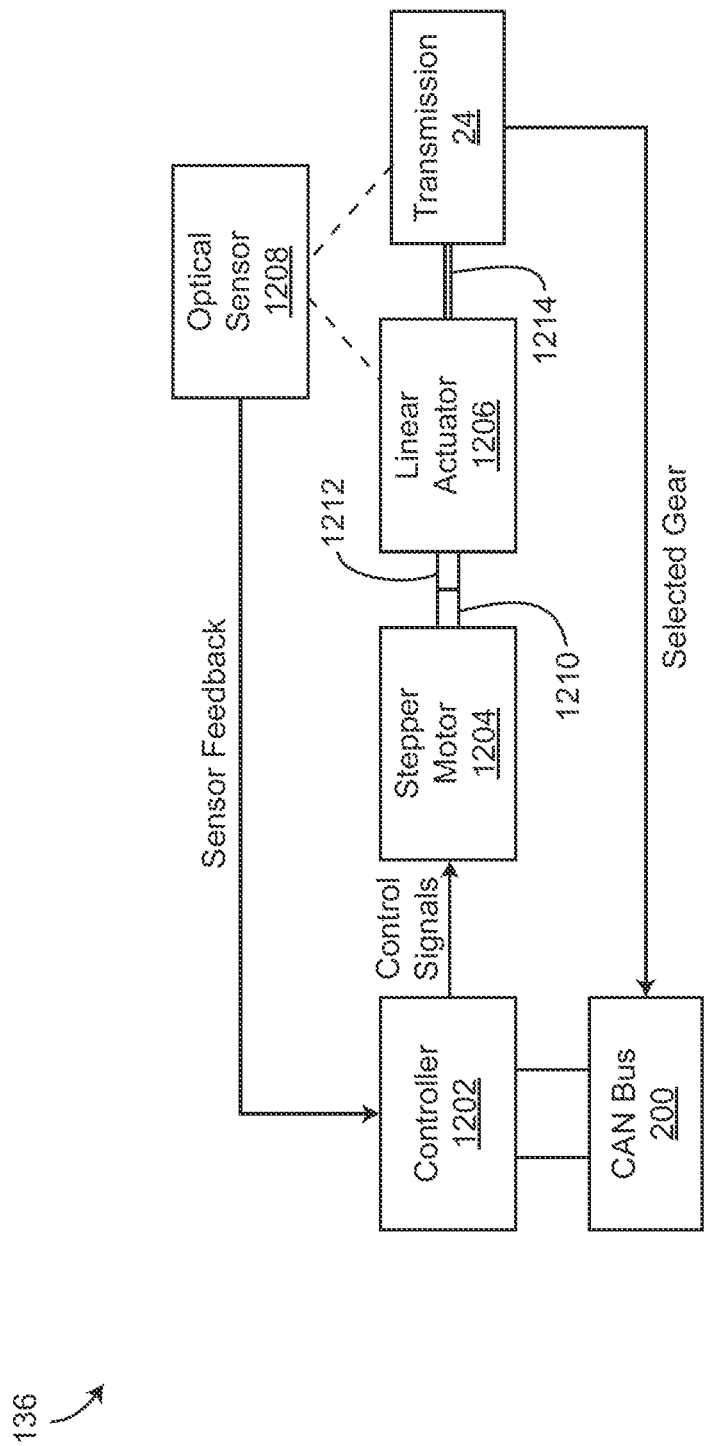
FIG. 12 is a block diagram of a gear shifting system, according to some embodiments.
Figure 13:
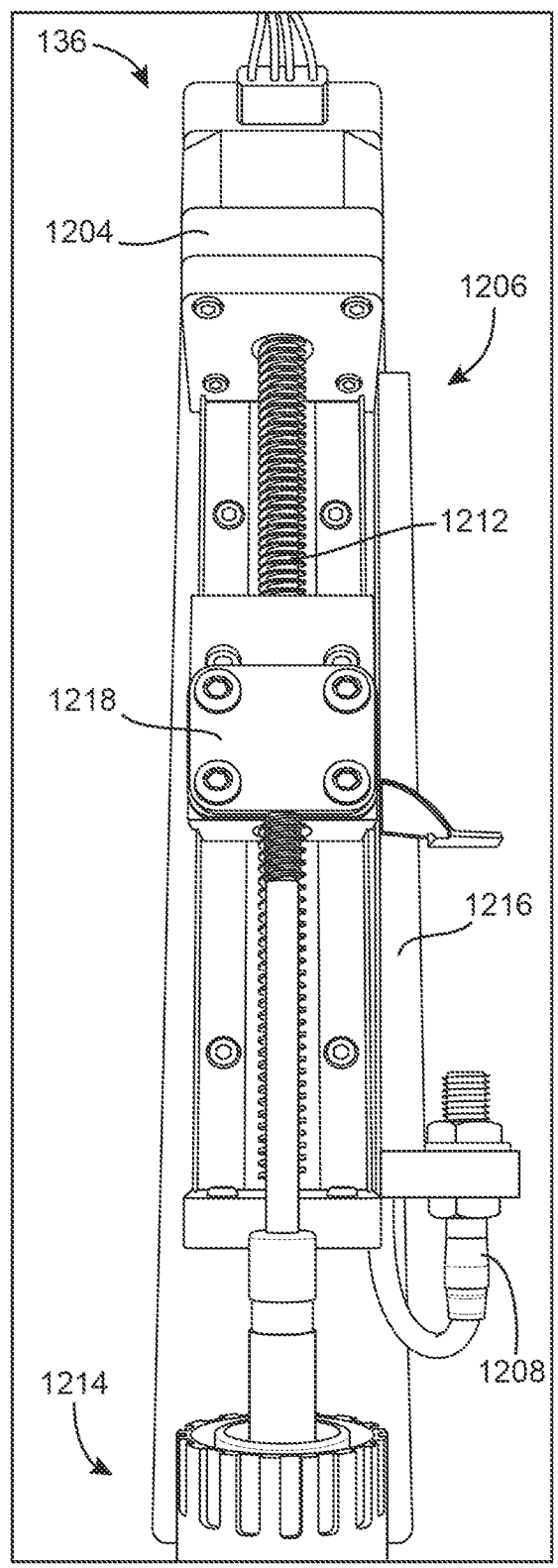
FIG. 13 is a view of the gear shifting system of FIG. 12, according to some embodiments.

Referring still to FIGS. 2A, 2B, and 12, the gear control system 136 may be retrofit into the vehicle 10 so that the operator of the vehicle 10 can transition the transmission 24 between the different gears using the control unit 300 (e.g., without manually or physically moving a lever). The stepper motor 1204, the linear actuator 1206, the optical sensor(s) 1208, brackets 1216, etc., can be physical installed on the vehicle 10 (e.g., coupled with the shifting cable 1214) with the controller 1202 communicably coupled on the CAN bus 200 (or the LIN bus 142) so that the operator can control or shift gears (e.g., of the transmission 24) by providing a user input at the control unit 300, without requiring the operator to physically move a shifter lever.

Referring to FIGS. 2A and 2B, the CAN bus 200 includes multiple devices communicably coupled on the CAN high 202 and the CAN low 204, according to some embodiments. Specifically, lights 144 (e.g., headlights, dome lights, lighting circuits, etc.), indicators 146 (e.g., turn indicators, hazard flashers, etc.), a horn 148, power windows 150, wipers 152, air conditioning (AC) 154, a parking brake 156, power mirrors 158, power doors 160, cruise control 162, door locks 164, and a radio 166 (e.g., an infotainment system). It should be understood that any of the devices shown in FIG. 2B that are communicably coupled on the CAN bus 200 may also be communicably coupled on the LIN bus 142. In some embodiments, any of the devices shown in FIG. 2B that are communicably coupled on the CAN bus 200 include controllers or electric motors that are communicably coupled on the CAN bus 200 (or on the LIN bus 142, depending on the configuration of the vehicle 10) which may be controlled by the ECA 106 (e.g., by interrupting, suppressing, modifying, and/or reproducing communications on the CAN bus 200 and/or the LIN bus 142 through operation of the VCNIC 140 (e.g., the CAN FD microcontroller 128), and/or the VLNIC 138) responsive to a user input at the control unit 300.

In this way, the ECA 106 may control operation of:
- lighting functionality of the vehicle 10 (e.g., dome lights, interior lights, headlights, etc.) by providing communications to the lights 144 (e.g., to the controllers thereof);
- indicator functionality of the vehicle 10 (e.g., turn indicators, left turn indicators, right turn indicators, hazard flashers, etc.) by providing communications to the indicators 146 (e.g., to the controllers thereof);
- horn functionality of the vehicle 10 (e.g., a siren, an aural alert device, etc.) by providing communications to the horn 148 (e.g., to the controller thereof);
- power window functionality of the vehicle 10 (e.g., front windows, rear windows, sunroof windows, moonroof windows, etc.) by providing communications to the windows 150 (e.g., to the controllers or electric motors thereof);
- wiper functionality of the vehicle 10 (e.g., windshield wipers, windshield wiper washer functionality, rear wipers, rear wiper washer functionality, etc.) by providing communications to the wipers 152 (e.g., to the controllers or wiper motors);
- AC functionality of the vehicle 10 (e.g., activating the AC, deactivating the AC, adjusting a temperature setpoint, etc.) by providing communications to the AC 154 (e.g., to a controller or electric clutch of the AC of the vehicle 10);
- parking brake functionality of the vehicle 10 (e.g., activating or deactivating a parking brake of the vehicle 10) by providing communications to the parking brake 156 (e.g., to a controller or electric motor of the parking brake);
- power mirror adjustment functionality (e.g., adjusting an orientation of side or rearview mirrors of the vehicle 10) by providing communications to the power mirrors 158 (e.g., to a controller or power mirror motor);
- power door adjustment (e.g., actuating a door between an open position and a closed position, deploying or retracting a wheelchair or disabled occupant system, operating a release mechanism of a wheelchair securement system, etc.) by providing communications to the power doors 160 (e.g., to a controller or one or more door motors);
- cruise control adjustment (e.g., increasing or decreasing a speed setpoint, activating or deactivating cruise control, pausing cruise control, cancelling cruise control, setting a speed setpoint, etc.) by providing communications to the cruise control 162 (e.g., to a controller of the cruise control 162);
- door lock adjustment (e.g., actuating the door locks between a locked state and an unlocked state) by providing communications to the door locks 164 (e.g., to a door lock motor or actuator or controller);
- radio or infotainment adjustment (e.g., changing a source, adjusting volume, changing a radio channel, etc.) by providing communications to the radio 166 of the vehicle 10;
- engine or electric motor starting or stopping (e.g., performing a starting operation or shutting off the primary mover 18) by providing communications to an engine ignition controller 168 (e.g., an ignition coil, a battery, etc.); and/or
- gear selection or adjustment of the transmission 24 of the vehicle 10.

Control Unit

Figure 3:
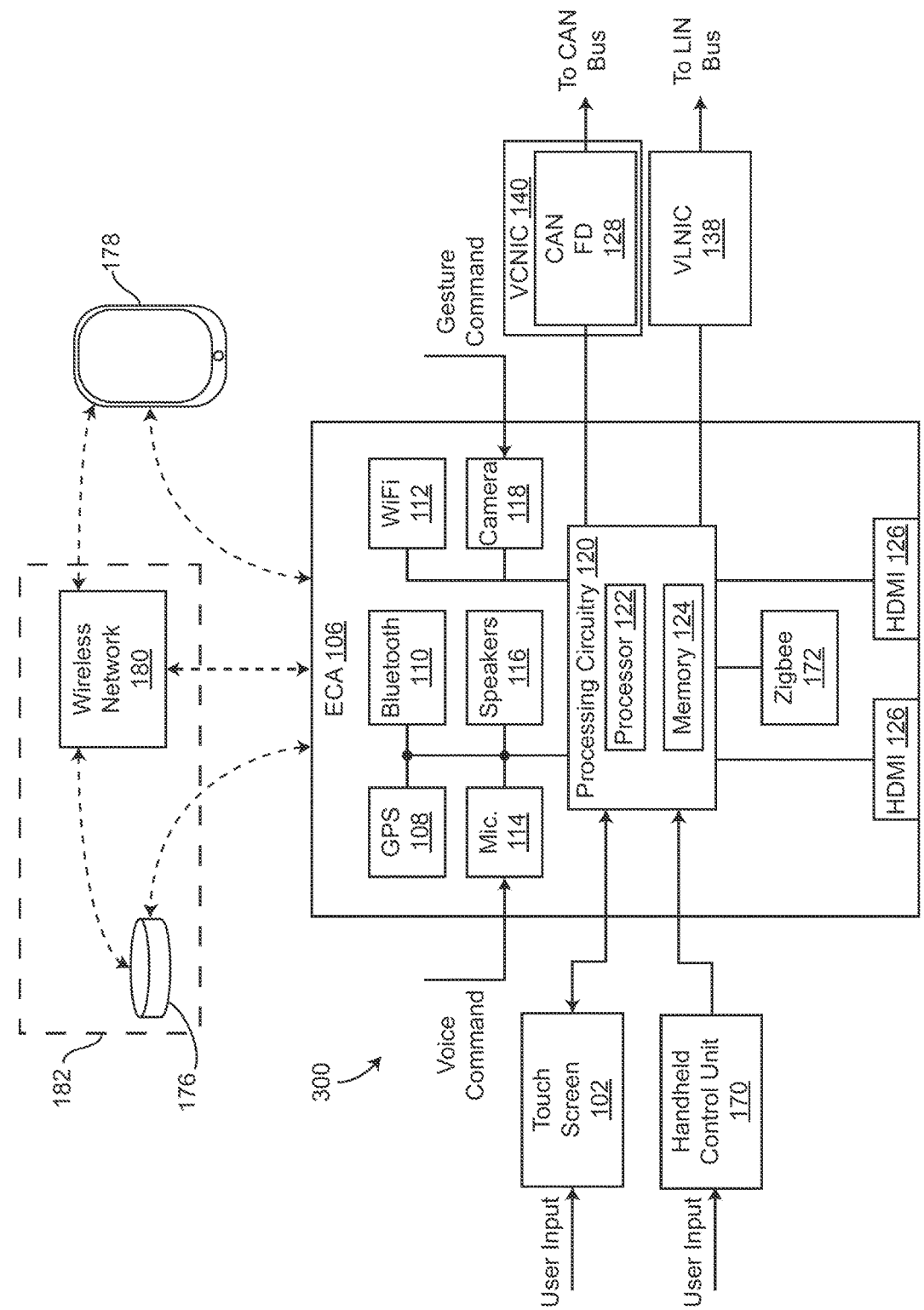
FIG. 3 is a block diagram of the control unit of FIG. 1, according to some embodiments.

Referring to FIG. 3, the control unit 300 includes the ECA 106, the touch screen 102, a handheld control unit 170, and the VCNIC 140 (e.g., that implements or includes the CAN FD microcontroller 128), according to some embodiments. In some embodiments, the control unit 300 is configured to receive a user input according to different modalities or from different input devices. The ECA 106 can send communications on the CAN bus 200 and/or the LIN bus 142 (e.g., by interrupting, suppressing, modifying, and/or reproducing communications on the CAN bus 200 and/or the LIN bus 142 via the CAN FD microcontroller 128, the VCNIC 140, and/or the VLNIC 138) to control different vehicle functionality responsive to the user inputs. Advantageously, the control unit 300 facilitates control of features or operations of the vehicle 10 at a single control point (e.g., the touch screen 102, a spoken command, etc.), according to a modality different than the controls of the vehicle 10 (e.g., via the touch screen 102 instead of at a physical switch in the vehicle 10), or using a different device (e.g., a personal computer device, a smartphone, a home management device, a remote control, etc.).

In some embodiments, the control unit 300 and the various components thereof (e.g., the touch screen 102, the ECA 106, the PLCs such as the VLNIC 138 and/or the VCNIC 140, the handheld control unit 170, etc.) form a retrofit control system for the vehicle 10. As such, the components of the control unit 300 may be denoted as "retrofit components" which can be installed in the vehicle 10 after the vehicle 10 is initially manufactured or sold to supplement or replace the original vehicle components (e.g., a manufacturer control system of the vehicle 10). It is understood that the vehicle 10 includes a plurality of "pre-retrofit components" which include any component of the vehicle 10 that is present before installing (i.e., retrofitting) the control unit 300. For example, pre-retrofit components of the vehicle 10 may include one or more physical switches, knobs, dials, buttons, levers, and/or any other user input devices that can be used to control various functions of the vehicle 10. Pre-retrofit components of the vehicle 10 may include a manufacturer control system (e.g., any controllers, user input devices, etc.) installed by a manufacturer of the vehicle 10 or otherwise present in the vehicle 10 prior to installing the retrofit control system.

Prior to installing the retrofit control system, the pre-retrofit components of the vehicle 10 may be configured to communicate on the CAN bus 200 and/or the LIN bus 142 to control various vehicle functions. For example, pre-retrofit components may be configured to obtain user input via a first modality of user input (e.g., pressing a physical button, flipping a physical switch, turning a knob, pulling a lever, etc.) and may provide a communication on the CAN bus 200 responsive to the user input. The communication on the CAN bus 200 and/or the LIN Bus 142 from the pre-retrofit components may cause the manufacturer control system of the vehicle to operate a corresponding vehicle component and/or control a vehicle function (e.g., lighting functionality, indicator functionality, horn functionality, power window functionality, wiper functionality, AC functionality, parking brake, etc.). In some cases, the first modality of user input may require a minimum level of dexterity and/or physical capability which may be lacking in some users with physical disabilities. Accordingly, some users may find it difficult to control the vehicle functions using the pre-retrofit components.

In some embodiments, the ECA 106 is configured to interrupt, suppress, or modify communications from one or more pre-retrofit components of the vehicle 10 on the CAN bus 200 and/or the LIN bus 142. The ECA 106 may obtain a user input from the touch screen 102 via a second modality of user input (e.g., touch-based input), which may require a lower level of dexterity and/or physical capability. The ECA 106 may generate a new communication on the CAN bus 200 and/or the LIN bus 142 based on the user input provided via the touch screen 102, such that the retrofit control system (e.g., the control unit 300, the ECA 106, etc.) provides control, via the touch screen 102, of one or more vehicle functions that are not controllable via touch screen by the manufacturer control system of the vehicle 10. Advantageously, these features allow users to control the various vehicle functions using a modality of user input different than the modality of user input provided by the manufacturer control system of the vehicle 10 for controlling the corresponding vehicle function. For example, users can provide touch-based input via the touch screen 102 instead of operating pre-retrofit components such as a physical switch, level, knob, etc. to control the vehicle functions that would otherwise be controllable using such pre-retrofit components prior to installing the retrofit control system.

Referring still to FIG. 3, the ECA 106 includes processing circuitry 120 including a processor 122 and memory 124. Processing circuitry 120 can be communicably connected to a communications interface such that processing circuitry 120 and the various components thereof can send and receive data via the communications interface. Processor 122 can be implemented as a general purpose processor, an application specific integrated circuit (ASIC), one or more field programmable gate arrays (FPGAs), a group of processing components, or other suitable electronic processing components.

Memory 124 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 124 can be or include volatile memory or non-volatile memory. Memory 124 can include database components, object code components, script components, or any other type of information structure for supporting the various activities and information structures described in the present application. According to some embodiments, memory 124 is communicably connected to processor 122 via processing circuitry 120 and includes computer code for executing (e.g., by processing circuitry 120 and/or processor 122) one or more processes described herein.

It should be understood that any operations of the ECA 106 as described herein may be performed by the processing circuitry 120. For example, when the ECA 106 is described as controlling communications on the CAN bus 200, the processing circuitry 120 may operate to control communications on the CAN bus 200.

The ECA 106 may receive one or more user inputs from an operator, user, or driver of the vehicle 10 via the touch screen 102. The ECA 106 can be configured to operate the touch screen 102 to provide a GUI to the user. The user may select different screens, press different buttons, etc., and otherwise navigate on the touch screen 102 to provide the user inputs. Responsive to receiving the user input (e.g., a request to activate, deactivate, adjust, etc., one or more of the functions described in greater detail above with reference to FIGS. 2A-2B and 12-13), the ECA 106 provides controls or commands to corresponding microcontrollers, controllers, electric motors, etc., to perform the requested function(s) by interrupting, suppressing, and/or reproducing communications on the CAN bus 200 or the LIN bus 142 (e.g., by operating the CAN FD microcontroller 128 of the VCNIC 140, and/or the VLNIC 138).

The ECA 106 is also configured to obtain one or more user inputs from the handheld control unit 170, according to some embodiments. In some embodiments, the handheld control unit 170 is a wireless remote that is configured to communicate with the ECA 106 via one or more wireless transceivers of the wireless remote and the ECA 106. In some embodiments, the handheld control unit 170 is wiredly coupled with the processing circuitry 120 of the ECA 106. In some embodiments, the handheld control unit 170 is positioned within the vehicle 10 (e.g., within reach of the operator of the vehicle 10) so that the operator can use the handheld control unit 170 to provide the user input. In some embodiments, operation of the handheld control unit 170 (e.g., depression of buttons, toggling of switches, etc.) is used by the processing circuitry 120 to operate the touch screen 102 between different GUIs. The operator may use the handheld control unit 170 to navigate through the different GUIs of the touch screen 102, and select an operation of the vehicle 10 to be updated, activated, de-activated, adjusted, etc. (e.g., any of the operations, functions, features, etc., of the vehicle 10 as described in greater detail above with reference to FIGS. 2A, 2B, and 12).

In some embodiments, the ECA 106 includes a camera 118 that is configured to provide image data to processing circuitry 120 of the ECA 106. The processing circuitry 120 may be configured to use the image data from the camera 118 (e.g., in combination with image analysis techniques, facial recognition technology, gesture detection, etc.) to identify when a user input has been provided by the operator or user of the vehicle 10 (e.g., a gesture, a spoken phrase, etc.), shown as gesture command. The user input can be provided as the gesture command and the processing ECA 106 (e.g., the processing circuitry 120) can use the gesture command to control a corresponding function of the vehicle 10 (e.g., any of the features, functions, or operations described in greater detail above with reference to FIGS. 2A, 2B, and 12) such as changing a gear of the transmission 24 of the vehicle 10. In some embodiments, the gesture command obtained from the camera 118 is used to navigate the touch screen 102 (e.g., to swipe between different screens or GUIs, select a specific button of the touch screen 102, etc.). In some embodiments, the facial recognition obtained by the camera 118 is also used for security to confirm that the current operator of the vehicle 10 is the owner of the vehicle 10 or an approved user. If the operator in the vehicle 10 is not an approved user or is not the owner of the vehicle 10, the ECA 106 may prevent starting of the vehicle 10.

The ECA 106 also includes a microphone 114 (e.g., an aural input device) that is configured to receive an aural input (e.g., a spoken input, speech of a user or operator, a spoken word or phrase, etc.), shown as voice command, according to some embodiments. In some embodiments, the voice command is a command to activate a specific feature (e.g., "Turn on front windshield wipers," "Lock the doors," "Set the cruise control," "Turn on high-beams," etc.) of the vehicle 10. The microphone 114 can provide sound data or audio data to the processing circuitry 120 which may perform a speech recognition technique (e.g., a transcription technique, etc.) to identify spoken words or phrases (e.g., requests to operate a certain function of the vehicle 10). In some embodiments, the voice command is a command to activate, de-activate, adjust, operate, etc., a specific function of the vehicle 10 (e.g., an accessory function, a driving operation, etc.). In some embodiments, the voice command is a command to navigate through various screens or GUIs of the touch screen 102 (e.g., spoken phrases such as "Next screen," "Go to home screen," etc.).

As described herein, the ECA 106 can receive user inputs according to different modalities as described herein. The ECA 106 can receive user inputs according to a spoken modality (via microphone 114), user inputs according to a gesture modality (via camera 118), user inputs according to a tactile modality (e.g., via the touch screen 102 or via the handheld control units 170). The user inputs described herein (e.g., according to any of the modalities) may be direct requests or commands to control operation of a feature of the vehicle 10 as described in greater detail above with reference to FIGS. 2A-2B, and 12. In some embodiments, the user inputs described herein (e.g., according to any of the modalities) are used to navigate through different screens or GUIs of the touch screen 102 which informs the operator regarding potential control options.

In some embodiments, the ECA 106 includes a global positioning system (GPS) module 108, a Bluetooth module 110, a WiFi module 112, and/or a Zigbee module 172. The GPS module 108 as shown in FIG. 3 may represent two independent GPS modules of the ECA 106 for improved accuracy and redundancy. The ECA 106 may include a mini Peripheral Component Interconnect Express (PCIe) port or connection through which a General Packet Radio Service (GPRS) 4G modem can be connected with the ECA 106 to facilitate 4G communications (e.g., communications on a 4G cellular network). The GPRS 4G modem may facilitate or enable high transfer rates of information at high speeds in order to update, sense, or diagnose the control system 100 over the air. In some embodiments, the GPRS 4G modem can connect the ECA 106 on a wireless network so that a remote system can monitor any communications or operations of the ECA 106. In some embodiments, data obtained by the DDL 130 is communicated to the remote system via the GPRS 4G modem for analysis.

The Bluetooth module 110 is configured to facilitate or enable communications between the ECA 106 and Bluetooth communicable devices such as a user device 178 (e.g., a smartphone, an Android phone, an iPhone, etc.), a home device 176, etc., according to some embodiments. In some embodiments, the Bluetooth module 110 is configured to obtain user inputs from the user device 178 (e.g., to perform any of the functions as described in greater detail above with reference to FIGS. 2A-2B and 12). In some embodiments, the user device 178 includes a mobile application which configures the user device 178 to communicate with the ECA 106, and to provide any of the GUIs of the touch screen 102 on a display screen or touch screen of the user device 178. In some embodiments, the ECA 106 is configured to establish communication with the user device 178 via the Zigbee module 172 or the WiFi module 112. In some embodiments, Zigbee module 172 is configured to communicably couple the ECA 106 with any Zigbee communicable devices, and the WiFi module 112 is configured to communicably couple the ECA 106 with any of a WiFi device, a WiFi network, etc.

The WiFi module 112 may also configure the ECA 106 to communicate with a WiFi network, shown as wireless network 180. In some embodiments, the wireless network 180 is a WiFi network of a home 182 (e.g., where the operator of the vehicle 10 lives). In some embodiments, when the vehicle 10 is within proximity of the wireless network 180 (e.g., in a driveway, in a garage of the home 182, etc.) the ECA 106 is configured to communicably couple on the wireless network 180 via the WiFi module 112. The wireless network 180 facilitates communicably coupling other devices on the wireless network 180 with the ECA 106, according to some embodiments. In some embodiments, the ECA 106 is communicably coupled with the home device 176 via the wireless network 180 (or directly via any of the Bluetooth module 110, the WiFi module 112, the Zigbee module 172, etc.). The ECA 106 can therefore communicate with the home device 176 to provide notifications or updates to the operator of the vehicle 10 via the home device 176 (e.g., when the operator is in the home 182), or to receive commands or user inputs from the home device 176 when the operator is in the house (e.g., receiving a command from the operator via the home device 176, the wireless network 180, and the WiFi module 112 such as "Start the car," or "Unlock the car" or "Open the passenger door of my car," etc.). In some embodiments, the PSU 132 is equipped with the Zigbee module 172 in addition to or in place of the ECA 106. The ECA 106 or the PSU 132 may detect low battery charge of the vehicle 10, and may send a message to any of the touch screen 102, the user device 178, the home device 176, etc., to notify the owner of the vehicle 10 regarding the low battery charge and that the vehicle 10 should be started. In some embodiments, the Zigbee module 172 is used for high-level communications protocols to communicably couple the ECA 106 with other Zigbee-enabled devices on a personal network (e.g., a home automation network). Advantageously, the Zigbee connection enables the user to receive messages or alerts and transmit commands to manage the home-connected devices and the vehicle 10.

For example, the ECA 106 may send an alert to the user when the user is in their home 182 responsive to low battery levels as detected by the PSU 132. The alert may include a visual message or a spoken message such as "The started battery charge of your vehicle is critical—please drive the vehicle for 30 to 60 minutes or connect a battery charger" which may be provided via the mobile application of the user device 178, on a webpage that the user can access, or aurally via the home device 176. Conversely, the user may send a command to the ECA 106 to start the primary mover 18 of the vehicle 10 and adjust temperatures of the inner volume 16 by speaking to the home device 176, starting the vehicle 10 from the user device 178, etc.

Referring still to FIG. 3, the ECA 106 includes one or more speakers 116 that are controlled by the processing circuitry 120 of the ECA 106, according to some embodiments. In some embodiments, the speakers 116 are configured to provide audio feedback to the user or the operator of the vehicle 10 as the operator or user of the vehicle 10 operates the touch screen 102 or while the user or operator is otherwise interacting with the control system 100. For example, the ECA 106 (e.g., the processing circuitry 120) can control the speakers 116 when the operator or user touches a button (e.g., a digital accessibility button (DAB)) on the touch screen 102 to recite a list of programmed commands. The user may touch the DAB button again once the user hears the desired command in order to activate the corresponding feature of the vehicle 10. The ECA 106 operates the controllers, electric motors, etc., of the vehicle 10 according to the desired command.

The ECA 106 also includes a pair of High-Definition Multimedia Interface (HDMI) ports 126, according to some embodiments. In some embodiments, the HDMI ports 126 facilitate external communicability so that the ECA 106 can be connected to a computer device, information can be downloaded from the ECA 106, the ECA 106 can be programmed, etc.

Touch Screen or Mobile Application GUIs

Referring to FIGS. 5-11, various GUIs for controlling one or more operations of functions of the vehicle 10 are shown, according to some embodiments. The GUIs shown in FIGS. 5-11 may be displayed on the touch screen 102 of the control unit 300, or may be displayed on a screen of the user device 178 that is configured with a mobile application. Selection of various functions results in a user input to perform that function being provided to the ECA 106 which causes the corresponding controller, electrical system, components, electric motors, etc., of the vehicle 10 to perform the requested function. Any of the functions shown in the GUIs herein with reference to FIGS. 5-11 represent controllable elements, systems, or features of the vehicle 10 that include corresponding modules, controllers, motors, electrical systems, batteries, etc., communicably coupled on the CAN bus 200 and/or the LIN bus 142 and may be operated by the ECA 106.

Figure 5:
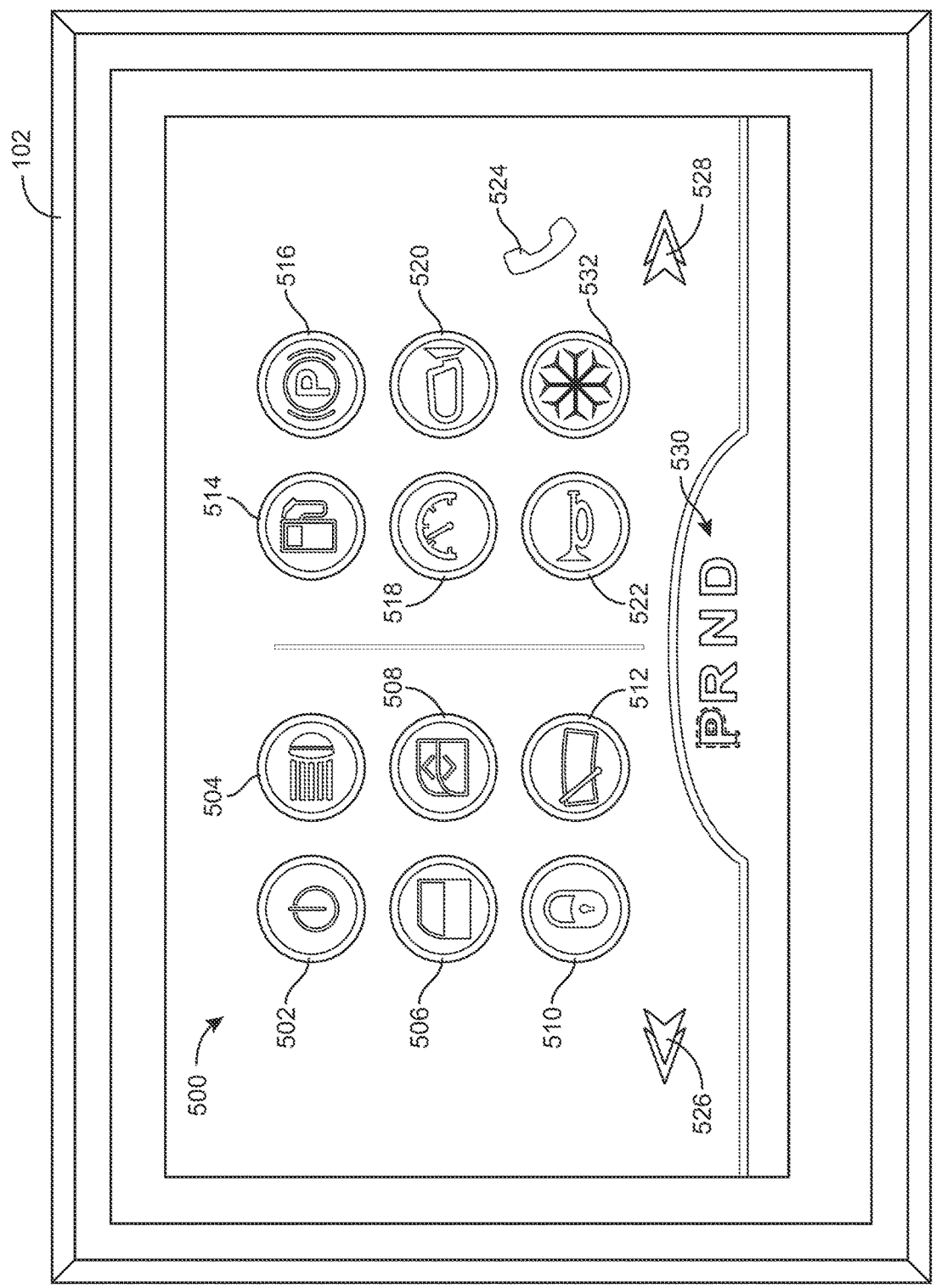
FIG. 5 is a diagram of a home screen graphical user interface (GUI) that can be displayed on a touch screen display of the control unit of FIG. 3, according to some embodiments.

Referring to FIG. 5, a home screen GUI 500 includes multiple buttons that can be pressed to navigate between different GUIs (e.g., by pressing a corresponding button on the touch screen 102 or the user device 179, or by using the handheld control unit 170), according to some embodiments. In some embodiments, the home screen GUI 500 includes a gear indicator 530 which indicates available gears and visually indicates which of the available gears are selected (e.g., by being highlighted, having a halo, having a different color, etc.). The home screen GUI 500 also includes a power button 502 that navigates to a power GUI 600 for starting the vehicle, a lighting button 504 that navigates to a lighting GUI 700 for changing lighting functions of the vehicle 10, a door button 506 that navigates to a door GUI 800, a window button 508 that navigates to a window GUI 900, a lock button 510, a wiper button 512 that navigates to a wiper GUI 1100, a fuel button 514 that navigates to a fuel GUI, a parking brake button 516, a cruise control button 518 that navigates to a cruise control GUI, a mirror button 520 that navigates to a window control GUI 1000, a horn button 522, a phone button 524 that navigates to a phone GUI or allows the user to make phone calls, an air conditioning button 532, and left and right arrow buttons 526 and 528 that can be pressed to view additional buttons that, when pressed, navigate to a corresponding GUI (e.g., a radio button that navigates to a radio/infotainment GUI, etc.), or transition between any of the GUIs shown in FIGS. 6-11.

Pressing the lock button 510 may cause door locks of the vehicle 10 to actuate between a locked position or an unlocked position. Pressing the horn button 522 (e.g., holding the horn button) may cause a horn of the vehicle 10 to be operated (e.g., as long as the horn button 522 is pressed by the user). Pressing the parking brake button 516 may activate or deactivate the parking brake (e.g., if the currently selected gear is a park gear). Pressing the fuel button 514 may activate a fuel door latch release. Similarly, pressing the cruise control button 518 may navigate to the cruise control GUI, and allows the user to adjust cruise control of the vehicle 10 such as increasing or decreasing a speed setpoint, activating or deactivating cruise control, pausing cruise control, cancelling cruise control, or setting a speed setpoint for the cruise control of the vehicle 10. Pressing the phone button 524 may navigate to the phone GUI where the user can perform or receive phone calls. Pressing the air conditioning button 532 may navigate to an air conditioning GUI where the use can change air conditioning settings (e.g., the temperature, fan speed, etc.).

The gear indicator 530 can include various icons (e.g., "P", "R", "N", and "D" icons) which may also function as buttons. The icons may be pressed to transition the transmission 24 of the vehicle 10 between different gears. In some embodiments, a left turn signal indicator button 526 and a right turn signal indicator button 528 can be pressed to activate a left turn indicator or right turn indicator, respectively. In some embodiments, the icons (e.g., the "P", "R", "N", and "D" icons) can be pressed to transition the transmission 24 of the vehicle 10 between different gears.

Figure 6:
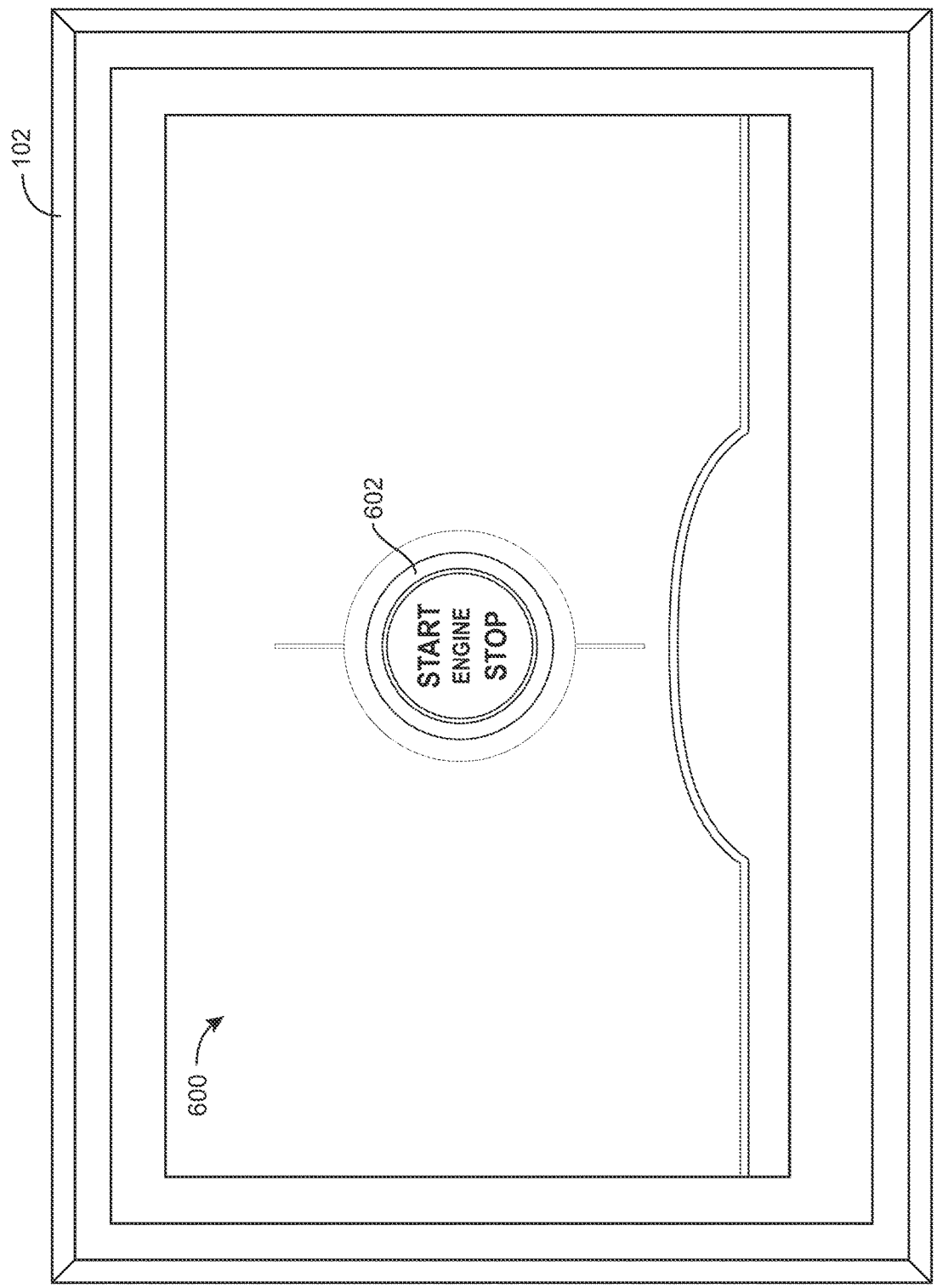
FIG. 6 is a diagram of an engine start/stop GUI that can be displayed on a touch screen display of the control unit of FIG. 3, according to some embodiments.

Referring to FIG. 6, the power GUI 600 includes a start/stop button 602, according to some embodiments. In some embodiments, the start/stop button 602 is an engine ignition button that can be pressed to start an engine of the vehicle 10 (e.g., the primary mover 18) or to shut off the engine of the vehicle 10. The start/stop button 602 can similarly be configured to actuate an electric motor of the vehicle 10 between an on state and an off state (e.g., if the vehicle 10 is an electric vehicle).

Figure 7:
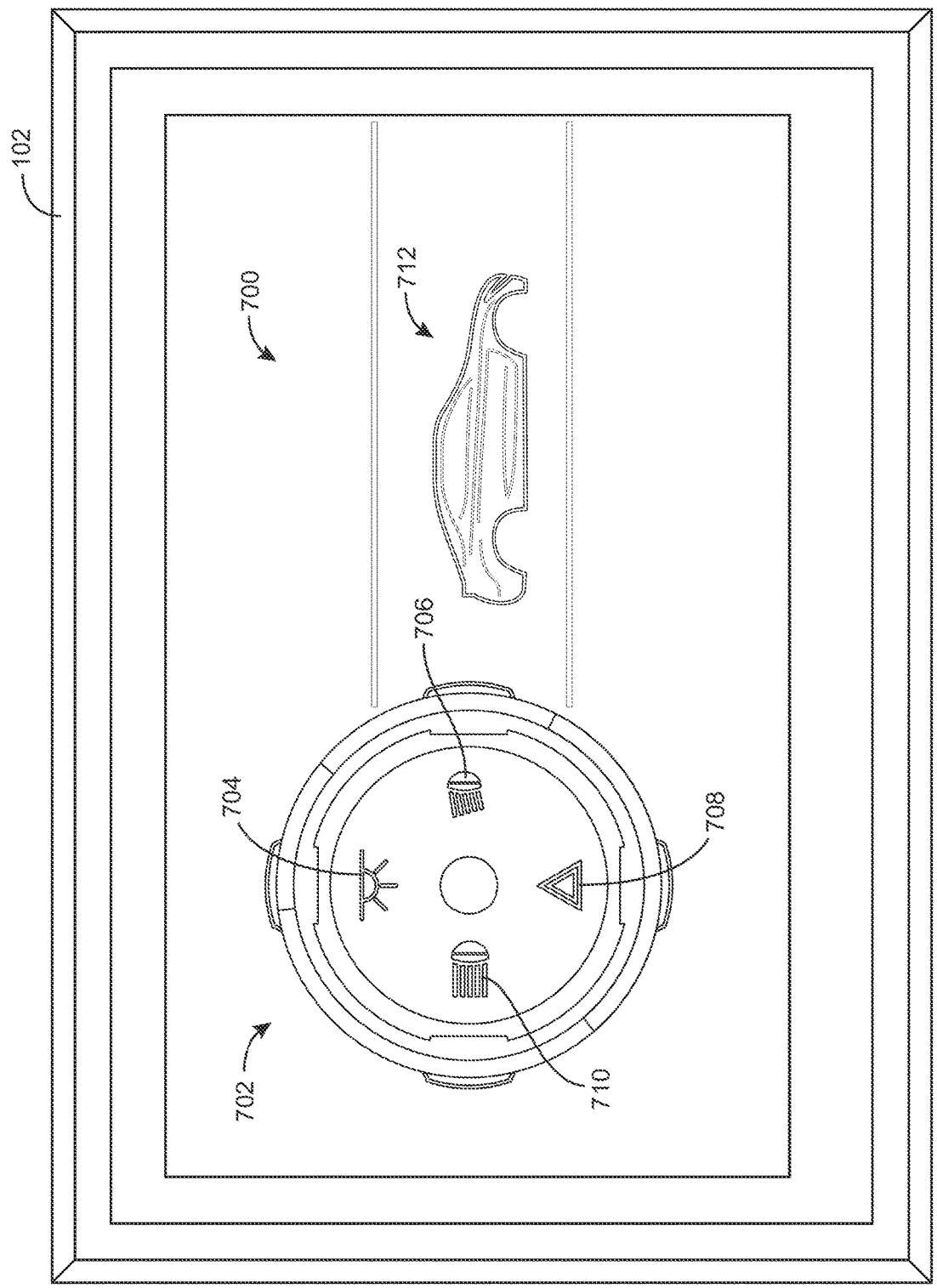
FIG. 7 is a diagram of a light control GUI that can be displayed on the touch screen display of the control unit of FIG. 3, according to some embodiments.

Referring to FIG. 7, the lighting GUI 700 includes a car icon 712, and a lighting icon 702. The car icon 712 may be updated to visually indicate which lights of the vehicle 10 are currently active. The lighting icon 702 includes a dome light icon 704, a high beam icon 710, a low beam icon 706, and a hazard flashers icon 708, according to some embodiments. In some embodiments, the high beam icon 710 can be pressed by the user to actuate high beam lights of the vehicle 10 between an on state and an off state. Similarly, the dome light icon 704, the low beam light icon 706, and/or the hazard flasher icon 708 can be pressed by the user to transition dome lights, low beams, and/or hazard flashers of the vehicle 10 between on states and off states. In some embodiments, pressing any of the buttons of the lighting icon 702 results in corresponding updates to the car icon 712 to thereby visually indicate to the operator of the vehicle 10 which lighting functions are currently active.

Figure 8:
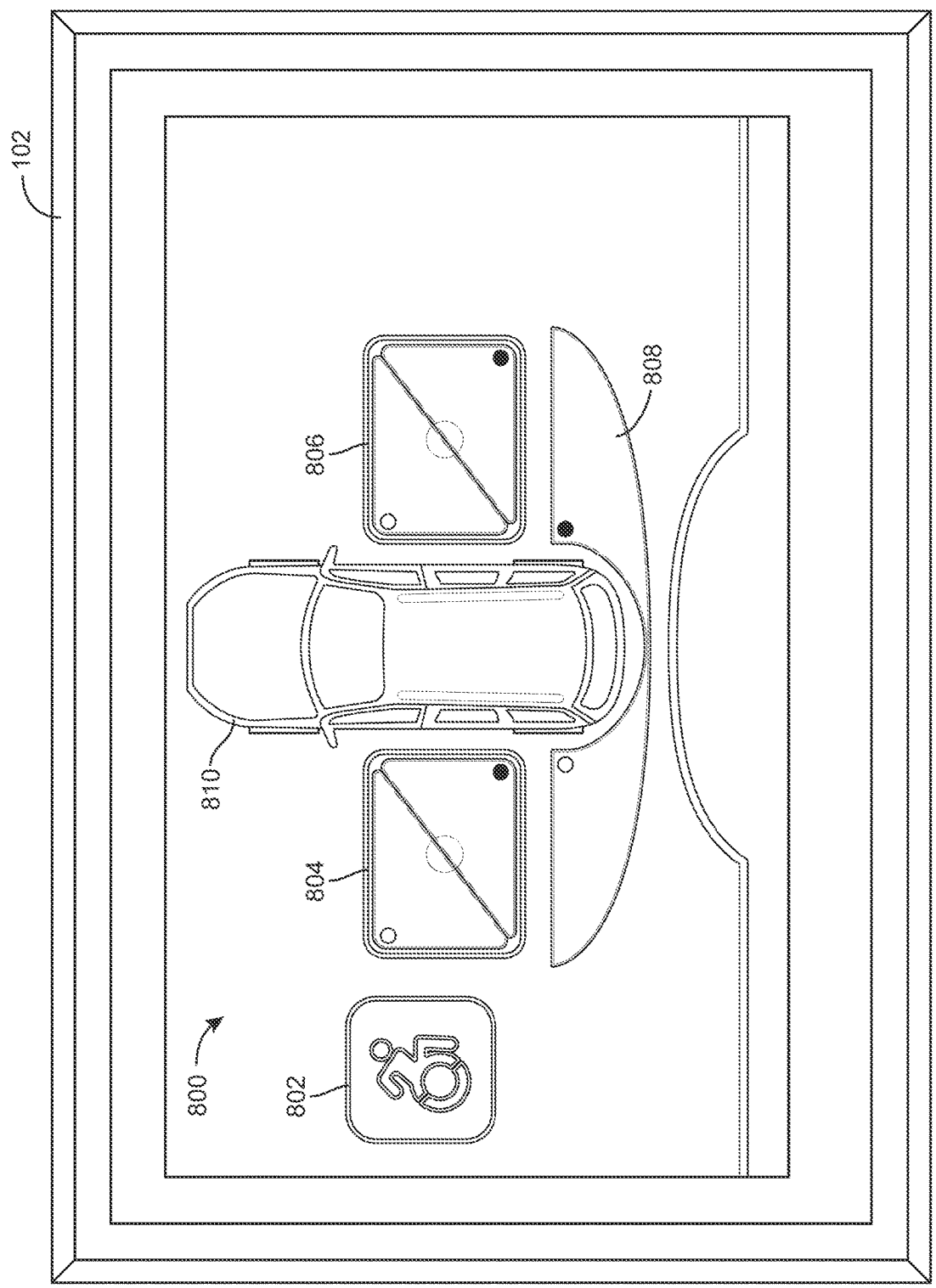
FIG. 8 is a diagram of a door control GUI that can be displayed on the touch screen display of the control unit of FIG. 3, according to some embodiments.

Referring to FIG. 8, the door GUI 800 includes a vehicle icon 810, a left door button 804, a right door button 806, and a wheelchair securement system release button 802, according to some embodiments. The vehicle icon 810 is configured to illustrate the vehicle 10 and provide reference so that the user or operator is informed regarding which side of the vehicle the buttons 804 or 806 operate. The wheelchair securement system release button 802 can operate a release mechanism of a wheelchair securement system. In some embodiments, the left door button 804 and the right door button 806 each include two portions. Pressing or pressing and holding an upper section of the buttons 804 and 806 can cause a corresponding door of the vehicle 10 (e.g., a left side or right side door, respectively) to operate to close, while pressing or pressing and holding a lower section of the buttons 804 and 806 causes the corresponding door of the vehicle 10 to operate to open (or vice versa). Similarly, a trunk button 808 can include two portions or two sections, and pressing a first section or portion may cause a trunk door of the vehicle 10 to open, while pressing a second section or portion may cause the trunk door of the vehicle 10 to close (or vice versa).

Figure 9:
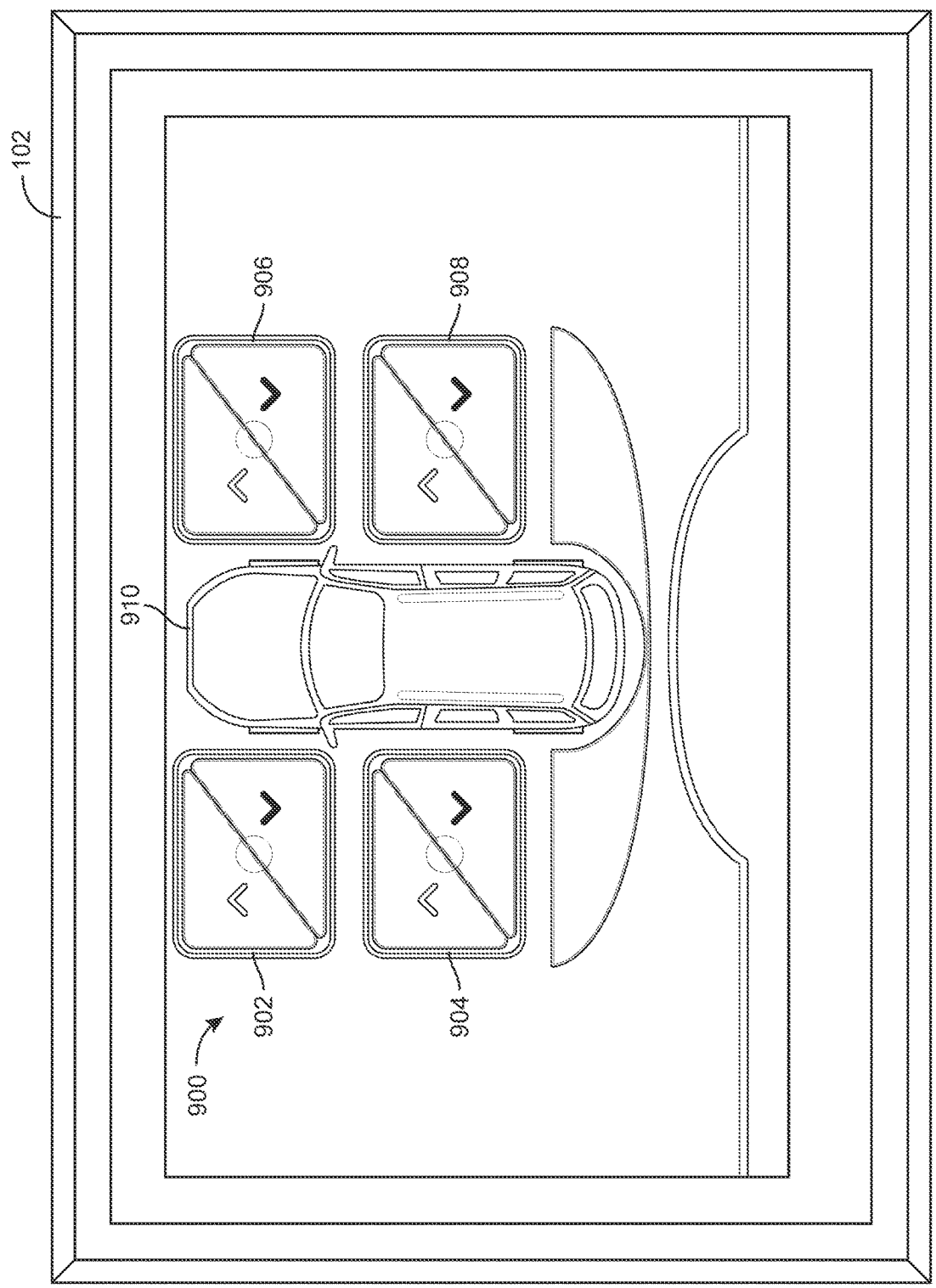
FIG. 9 is a diagram of a window control GUI that can be displayed on the touch screen display of the control unit of FIG. 3, according to some embodiments.

Referring to FIG. 9, the window GUI 900 includes a vehicle icon 910 (that represents the vehicle 10), and multiple window buttons 902-908, according to some embodiments. In some embodiments, each of the window buttons 902-908 can be pressed to operate a corresponding window (e.g., to raise or lower the window). The vehicle icon 910 can provide reference so that the user or operator knows which of the window buttons 902-908 is associated with which window.

Figure 10:
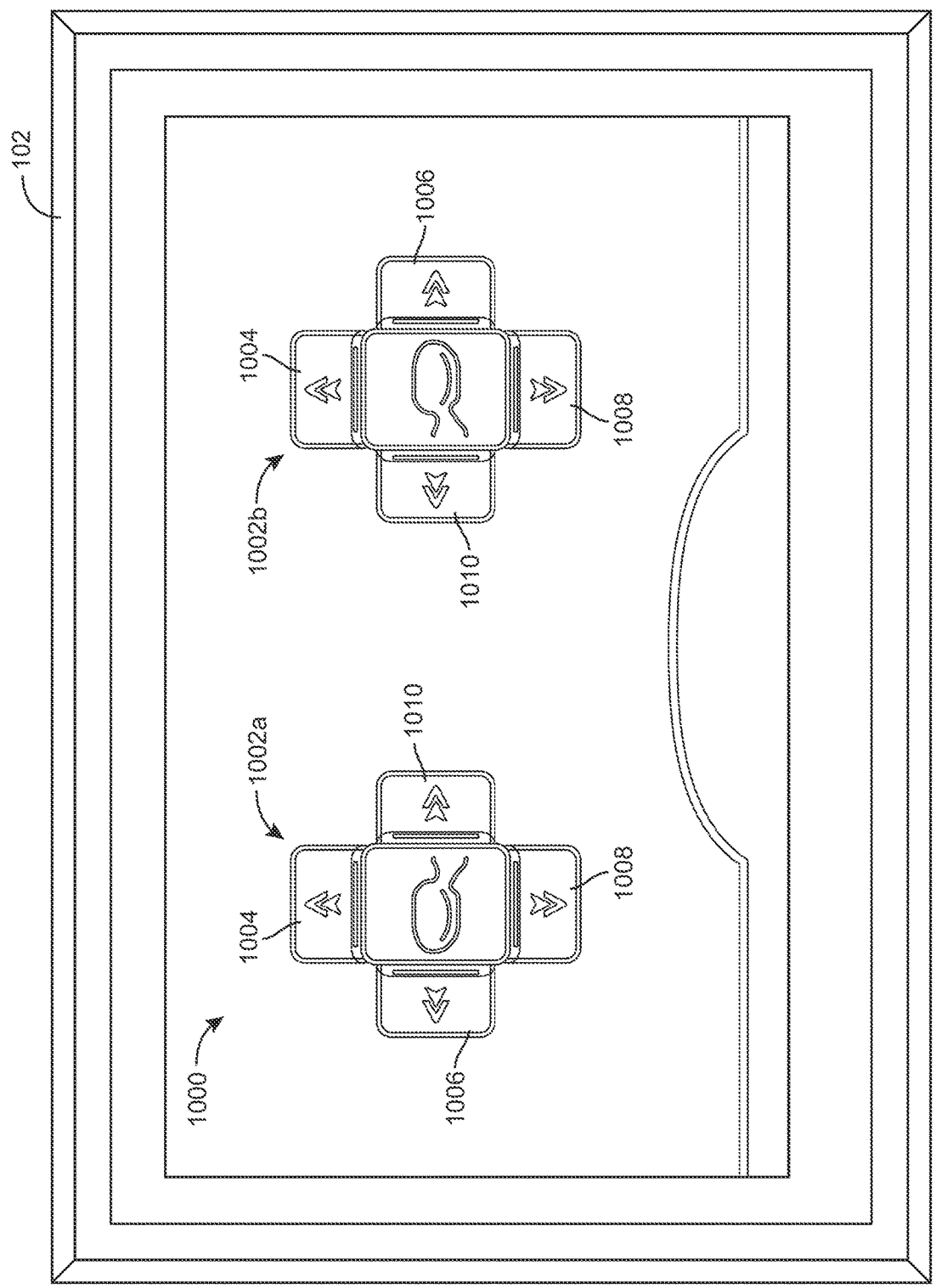
FIG. 10 is a diagram of a power mirror control GUI that can be displayed on the touch screen display of the control unit of FIG. 3, according to some embodiments.

Referring to FIG. 10, the mirror GUI 1000 includes a left mirror icon 1002a and a right mirror icon 1002b, according to some embodiments. In some embodiments, the left mirror icon 1002a and the right mirror icon 1002b each include an up button 1004, an outwards button 1006, a down button 1008, and an inwards button 1010. The up button 1004 of the left mirror icon 1002a or the right mirror icon 1002b can be pressed by the user so that the ECA 106 operates a left mirror or a right mirror to rotate or adjust upwards, the down button 1008 of the left mirror icon 1002a or the right mirror icon 1002b can be pressed so that the left mirror or the right mirror rotates or adjusts downwards, the inwards button 1010 of the left mirror icon 1002a or the right mirror icon 1002b can be pressed so that the left mirror or the right mirror rotate inwards, or the outwards button 1006 of the left mirror icon 1002a or the right mirror icon 1002b can be pressed so that the left mirror or the right mirror rotate outwards.

Figure 11:
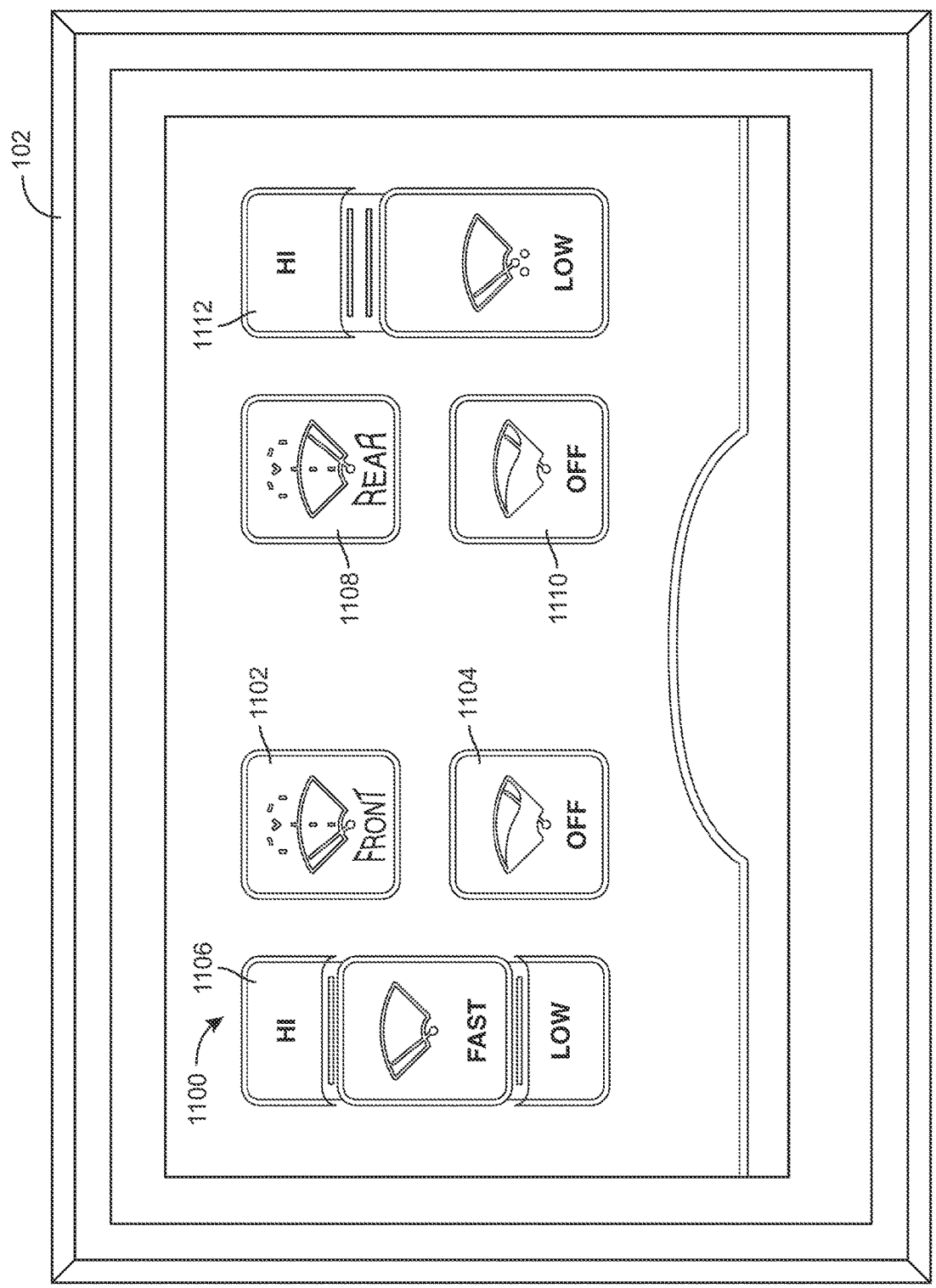
FIG. 11 is a diagram of a wiper control GUI that can be displayed on the touch screen display of the control unit of FIG. 3, according to some embodiments.

Referring to FIG. 11, the wiper GUI 1100 includes a front wiper button 1106, a front sprayer button 1102, a front off button 1104, a rear sprayer button 1108, a rear off button 1110, and a rear wiper button 1112, according to some embodiments. In some embodiments, the front wiper button 1106 includes an up button and a down button to increase or decrease an intermittent speed of windshield wipers of the vehicle 10. Pressing the "HI" button of the front wiper button 1106 may increase a speed of the wipers of the vehicle 10 (e.g., decrease an amount of time between subsequent wiping operations), while pressing the "LOW" button of the front wiper button 1106 may decrease the speed of the wipers of the vehicle 10 (e.g., increase the amount of time between subsequent wiping operations). The front wiper button 1106 may also include a "FAST" button or section, which when pressed by the user, causes the windshield wipers to be operated at a fast or specific speed. The front sprayer button 1102 can be pressed and held or released by the user or the operator to activate or deactivate a windshield washer system (e.g., to activate a pump that drives discharge of washing fluid onto the windshield and operating the windshield wipers). In some embodiments, the front off button 1104 can be pressed to shut off or stop operation of the windshield wipers. The rear sprayer button 1108 can be pressed and held or released by the user or the operator to activate or deactivate a rear window washer system (e.g., to activate the pump that drives discharge of the washing fluid onto the rear window and operating rear window wipers). In some embodiments, the rear off button 1110 can be pressed to turn off or deactivate operation of the rear window wipers. The rear wiper button 1112 can include an upper button (e.g., a "HI" button) and a lower button (e.g., a "LOW" button) which may be pressed by the user to transition rear wipers of the vehicle between a high speed and a low speed.

Touch Screen Mounting

Figure 14:
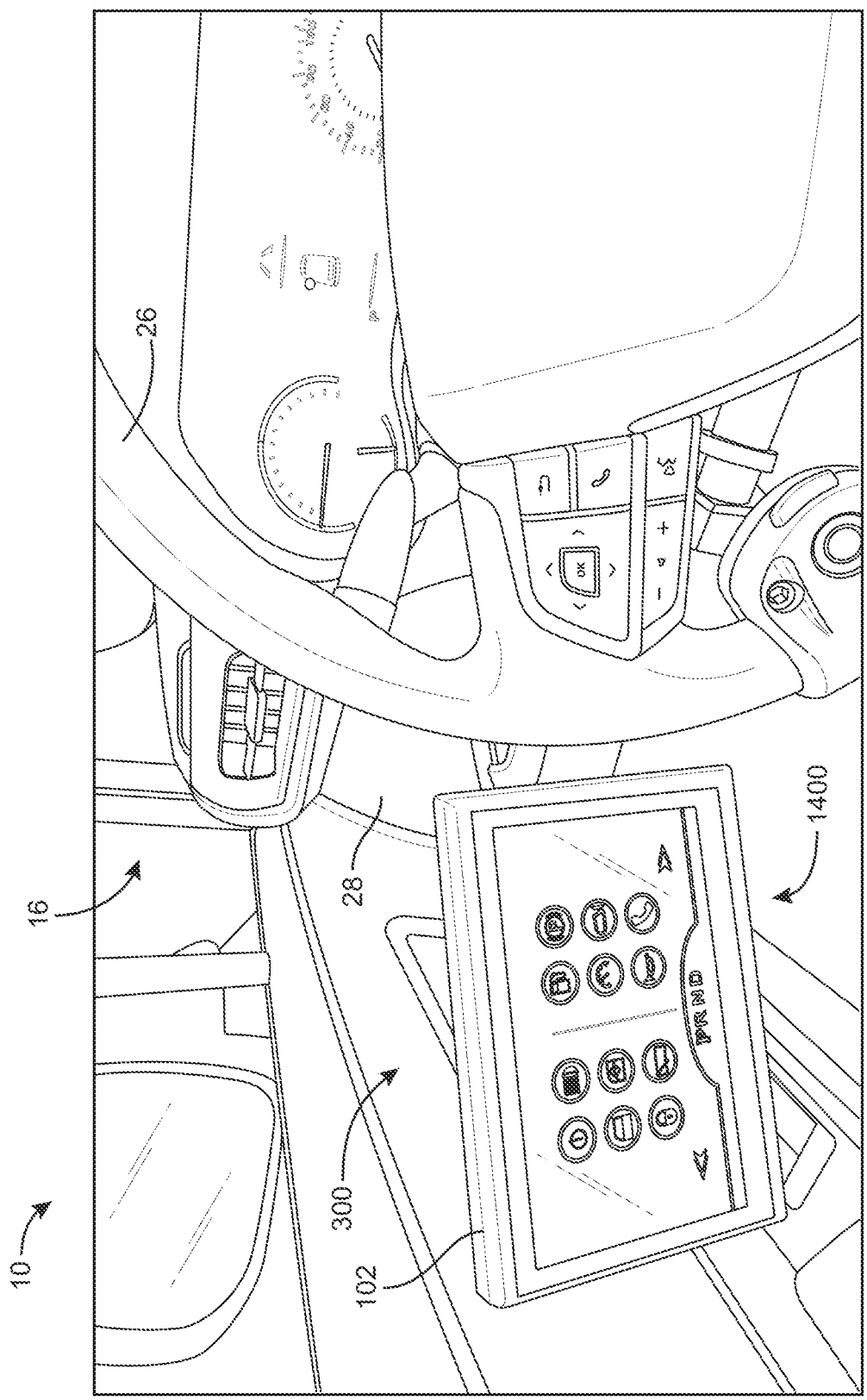
FIG. 14 is a perspective view of an interior of the vehicle of FIG. 1 including the control unit of FIG. 3 installed proximate a steering wheel of the vehicle, according to some embodiments.
Figure 15:
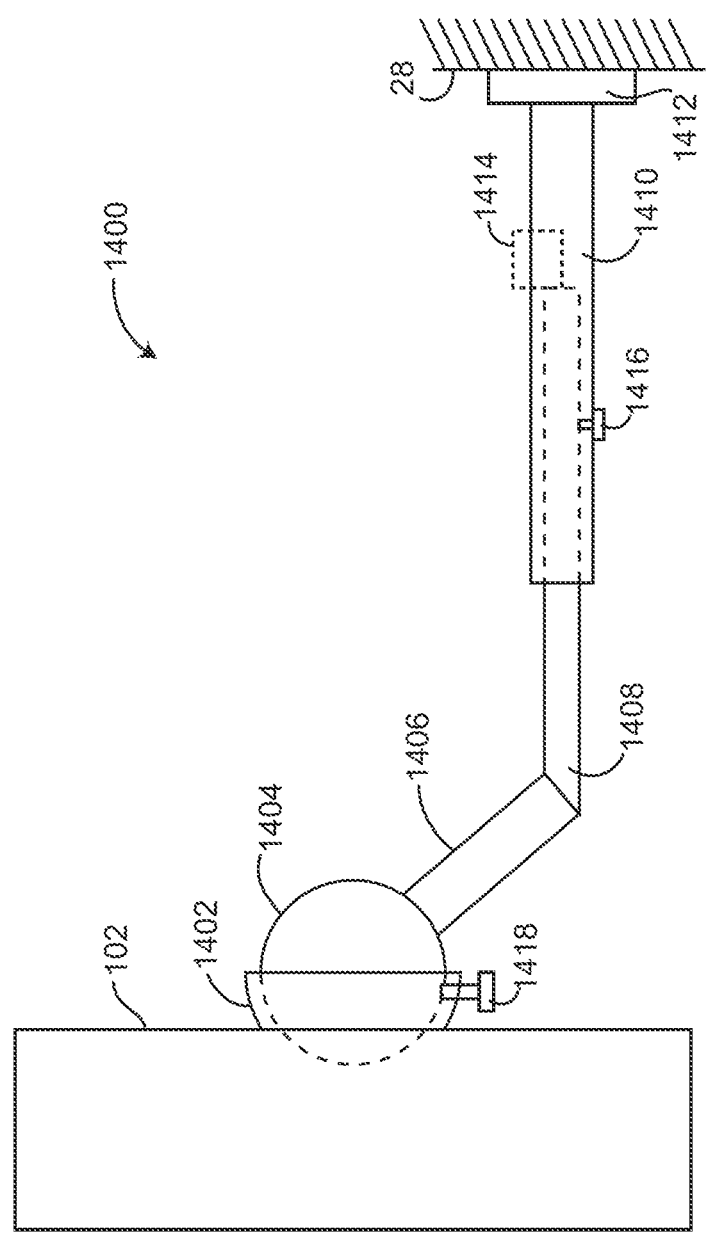
FIG. 15 is a diagram of a mounting system for the touch screen display of the control unit of FIG. 3, according to some embodiments.

Referring to FIGS. 14-15, the touch screen 102 can be mounted within the inner volume 16 of the vehicle 10 via a mounting system 1400 (e.g., an apparatus). The touch screen 102 may be positioned directly to a left or a right of a steering wheel 26 of the vehicle 10. The mounting system 1400 may extend between the touch screen 102 and a dashboard 28 of the vehicle 10 (or a structural portion of the vehicle 10). The mounting system 1400 may be configured to extend or retract and rotate the touch screen 102 relative to the dashboard 28 so that the touch screen 102 is within reach of the user. The touch screen 102 may be curved about either direction of the touch screen such as about a horizontal axis of the touch screen 102 or about a vertical axis of the touch screen 102.

Referring particularly to FIG. 15, the mounting system 1400 can include an outer tubular member 1410, an inner elongated member 1408, an elongated member 1406, a ball member 1404, and a receiver 1402, according to some embodiments. In some embodiments, the mounting system 1400 also includes a mounting member 1412 (e.g., a clamp, a plate with openings for fasteners, etc.) configured to secure, fasten, attach, or otherwise fixedly couple the outer tubular member 1410 with the dashboard 28 of the vehicle 10. The outer tubular member 1410 is configured to receive the inner elongated member 1408 to form a telescoping assembly, according to some embodiments. In some embodiments, the outer tubular member 1410 is slidably coupled with the inner elongated member 1408 so that the inner elongated member 1408 can be extended and retracted relative to the outer tubular member 1410. The outer tubular member 1410 and the inner elongated member 1408 may be manually extended or retracted, or the inner elongated member 1408 can be driven to translate relative to the outer tubular member 1410 by electric motor 1414. In some embodiments, the outer tubular member 1410 includes an opening or a threaded bore through which a set screw 1416 extends. The set screw 1416 can be tightened so that the set screw 1416 engages the inner elongated member 1408 to limit relative translation of the inner elongated member 1408 and the outer tubular member 1410. In some embodiments, the elongated member 1406 and the inner elongated member 1408 are fixedly coupled with each other, or hingedly coupled with each other. In some embodiments, the elongated member 1406 and the inner elongated member 1408 are coupled with each other through a ball and socket joint.

The elongated member 1406 is fixedly coupled or integrally formed with the ball member 1404, according to some embodiments. The ball member 1404 is received within the receiver 1402 (e.g., a socket) that is fixedly coupled or integrally formed with the touch screen 102, according to some embodiments. In some embodiments, the receiver 1402 is configured to receive or threadingly couple with a set screw 1418 that can be turned in either direction to allow relative rotation between the receiver 1402 and the ball member 1404 or limit relative rotation between the receiver 1402 and the ball member 1404. In some embodiments, the ball member 1404 and the receiver 1402 are configured to form a ball and socket joint which facilitates adjustment of the touch screen 102 (e.g., rotation) in any direction. Advantageously, the mounting system 1400 facilitates positioning the touch screen 102 within reach of a user or operator of the vehicle 10 that has a physical disability to thereby allow operation of various features of the vehicle 10 that the user would otherwise be unable to control (e.g., due to decreased fine motor skills).

Figure 16:
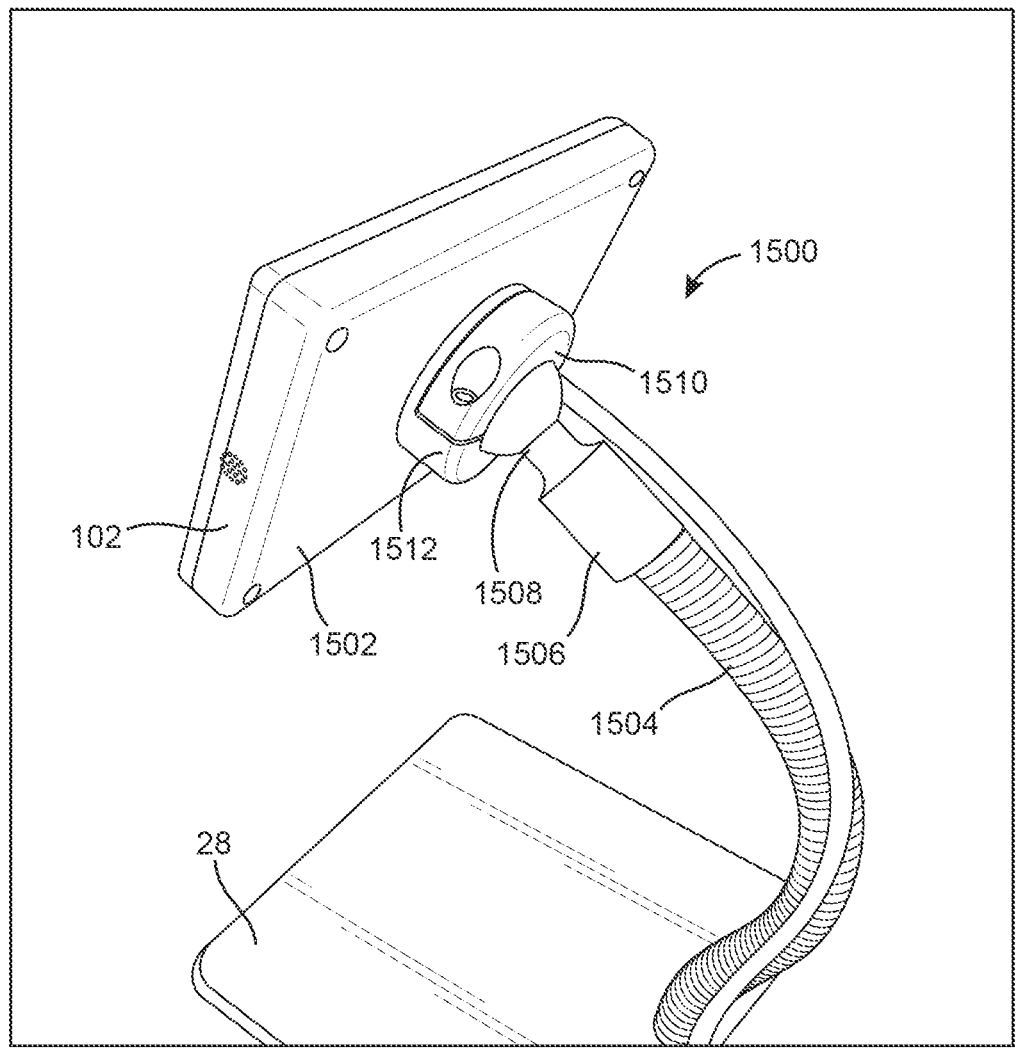
FIG. 16 is a diagram of another mounting system for the touch screen display of the control unit of FIG. 3, according to some embodiments.
Figure 17:
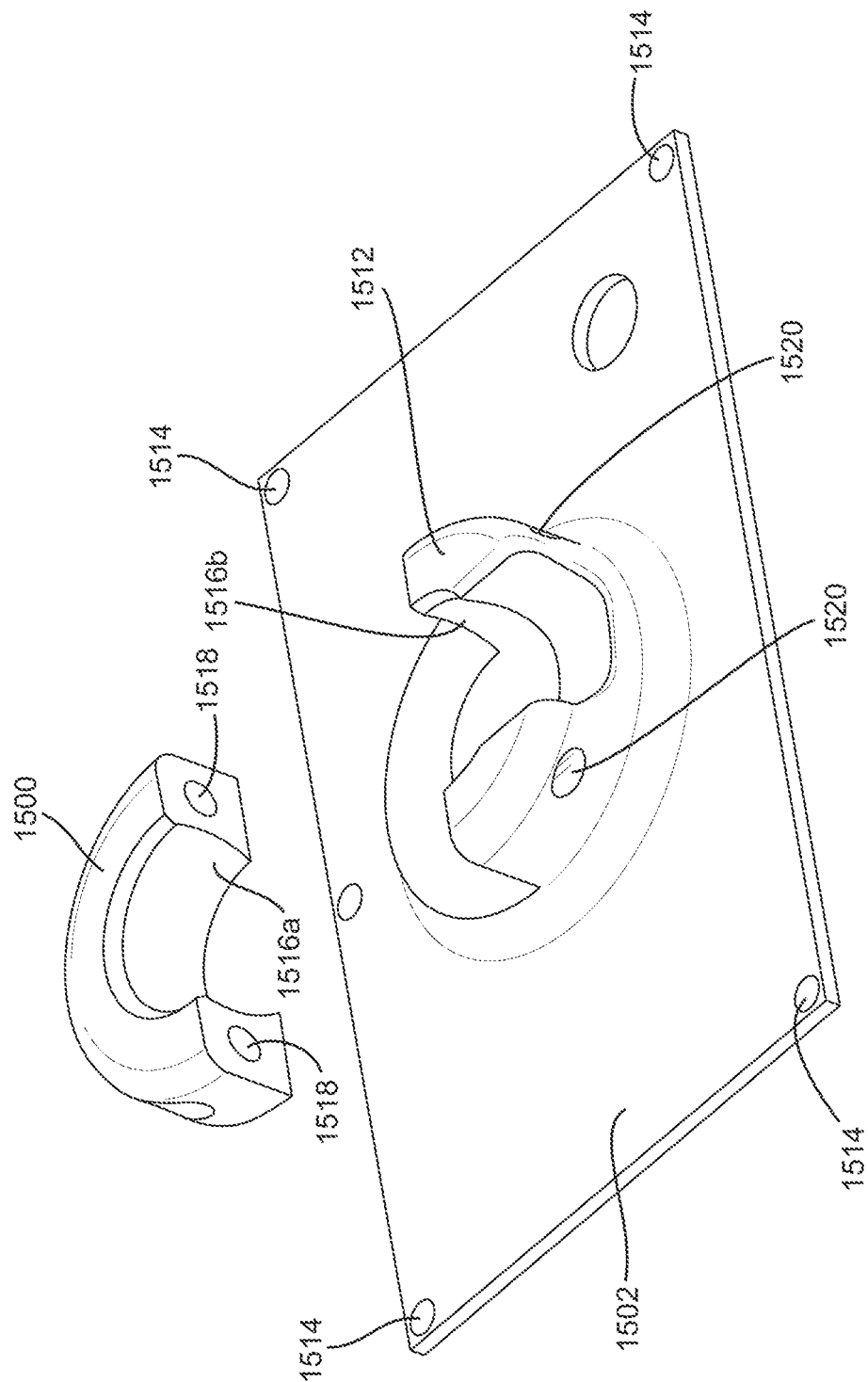
FIG. 17 is an exploded perspective view of a portion of the mounting system of FIG. 16, according to some embodiments.

Referring to FIGS. 16 and 17, another mounting system 1500 that can be used to mount the touch screen 102 on the dashboard 28 is shown, according to some embodiments. The mounting system 1500 includes a bendable member 1504 that fixedly couples with the dashboard 28 and supports the touch screen 102. The bendable member 1504 may be adjustable by hand and may maintain a current state or position once the touch screen 102 is adjusted to a desired position. In some embodiments, the bendable member 1504 is formed by multiple linkages that are arranged in series and provide sufficient frictional interfaces between each other to maintain a current shape of the bendable member 1504. In some embodiments, the bendable member 1504 is or includes a malleable material that has sufficient structural strength to be bent in multiple directions and maintain its shape when the touch screen 102 is adjusted to the desired position.

The bendable member 1504 includes an end member 1506 that forms a ball 1608. The ball 1608 is received between a first annular member 1510 and a second annular member 1512 that provide a clamping force to the ball 1608. The first annular member 1510 may be fastened or removably coupled with the second annular member 1512. The second annular member 1512 is integrally formed with a plate 1502 that is coupled with (e.g., via fasteners extending through holes, bores, openings, etc., shown as apertures 1514) the touch screen 102 to thereby couple the touch screen 102 on the end of the bendable member 1504. In some embodiments, the first annular member 1510 and the second annular member define surfaces 1516a and 1516b that cooperatively define a spherical surface that corresponds to the shape of the ball 1508. The first annular member 1510 includes openings 1518 (e.g., threaded holes, smooth bores, etc.), according to some embodiments. The second annular member 1512 includes openings (e.g., threaded holes, smooth bores, etc.), according to some embodiments. In some embodiments fasteners extend through the openings 1518 and the openings 1520 to couple the first annular member 1510 with the second annular member 1512 with the ball 1508 positioned between the first annular member 1510 and the second annular member 1512. The annular members 1510 and 1512 may form a socket within which the ball 1508 is received. In some embodiments, the fasteners that couple the first annular member 1510 with the second annular member 1512 are adjustable so that the touch screen 102 may be adjusted to a desired orientation. The fasteners that couple the first annular member 1510 with the second annular member 1512 may be adjusted (e.g., tightened) to clamp the ball 1508 in the socket formed by the first annular member 1510 and the second annular member 1512 so that the touch screen 102 is locked at the desired orientation.

Process

Figure 4:
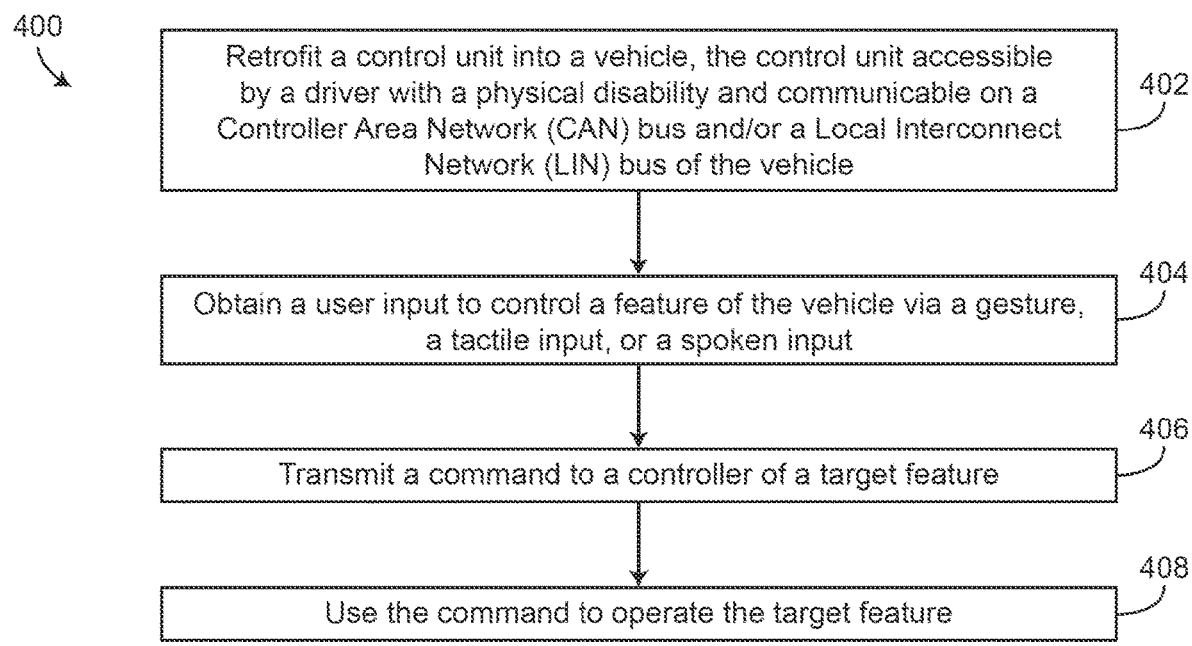
FIG. 4 is a flow diagram of a process for controlling one or more features of a vehicle, according to some embodiments.

Referring to FIG. 4, a process 400 for controlling a vehicle for physically disabled users is shown, according to some embodiments. The process 400 includes steps 402-408 and can be performed by the control system 100 once the control system 100 is configured and installed on a vehicle. The process 400 facilitates changing a modality of user inputs for various features of a vehicle to thereby allow or enable a physically disabled operator to control features. In particular, the process 400 may facilitate user input for a user with decreased fine motor skills. For example, certain features of a vehicle may be designed by the vehicle manufacturer to require fine motors skills (e.g., using fingers to press switches, grasping certain shapes of input devices, etc.) which can be difficult for a physically disabled user to operate. Advantageously, the control system 100 and the process 400 as described herein facilitate allowing a physically disabled user or a user with decreased fine motor skills to control various features of the vehicle 10 which the user could not otherwise operate, or which would be difficult for the user to operate.

The process 400 includes retrofitting a control unit into a vehicle, the control unit accessible by a driver with a physical disability and communicable on a Controller Area Network (CAN) bus and/or a Local Interconnect Network (LIN) bus of the vehicle (step 402), according to some embodiments. In some embodiments, step 402 is performed by a technician by installing various components of the control system 100 as described in greater detail above with reference to FIGS. 2A-2B, 12-13, and 14-15. For example, step 402 can include installing the touch screen 102 within the vehicle 10 with the mounting system 1400, communicably connecting the ECA 106 on the CAN bus 200, communicably connecting various of the peripheral devices shown in FIG. 2A on the CAN bus 200 (e.g., the VLNIC 138, the VCNIC 140 or the CAN FD microcontroller 128 functionality implemented on the VCNIC 140, etc.), installing the components of the gear control system 136, etc. In some embodiments, performing step 402 configures the control unit to control, activate, or deactivate various features which would otherwise be operated by local switches positioned about a cabin of the vehicle.

The process 400 also includes obtaining a user input to control a feature of the vehicle via a gesture, a tactile input, or a spoken input (step 404), according to some embodiments. The tactile inputs can be obtained as button presses or touching a screen at any of the touch screen 102, the user device 178, the handheld control unit 170, etc. The gestures can be hand gestures, facial gestures, etc., and can be identified by the control unit (e.g., the ECA 106 or processing circuitry 120 thereof) via image data obtained by a camera or imaging device (e.g., camera 118), using one or more recognition techniques (e.g., facial recognition techniques, gesture detection, etc.). The spoken input can be obtained at a microphone (e.g., microphone 114) of the control unit (e.g., the ECA 106), at a home device (e.g., home device 176), or at a user's smartphone that is equipped with a mobile application (e.g., the user device 178). In some embodiments, step 404 is performed by the ECA 106, which may obtain the user inputs (e.g., requests to perform an associated function of the vehicle) from a variety of sources.

The process 400 also includes transmitting a command to a controller of a target feature (step 406), according to some embodiments. In some embodiments, step 406 is performed by the ECA 106, the CAN FD microcontroller 128, the VCNIC 140, and/or the VLNIC 138 to transmit the command along a CAN bus of the vehicle, or a LIN bus of the vehicle (e.g., the CAN bus 200, the LIN bus 142, etc.). In some embodiments, step 406 includes interrupting, suppressing, modifying, and/or reproducing communications on the CAN bus or the LIN bus of the vehicle. The command can be provided to a controller of the target feature, or to an electric motor of the target feature. The command may be a command to adjust operation of, activate, or deactivate the target feature. In some embodiments, the target feature is any of lighting, indicators, horn, power windows, wipers, AC or heating, parking brake, power mirrors, power doors, cruise control, door lock, radio or infotainment, engine or electric motor ignition, a gear control system, etc.

The process 400 includes using the command to operate the target feature (step 408), according to some embodiments. In some embodiments, the command is used by the target feature (e.g., by a controller, a microcontroller, a logic controller, an electric motor, etc.) to operate the target feature (e.g., to adjust operation of the target feature, to activate the target feature, to deactivate the target feature, etc.). In some embodiments, step 408 is performed by a peripheral device or a controller or module of the target feature that is communicable on the CAN bus of the vehicle, the LIN bus of the vehicle, or any other communications system of the vehicle.

Intelligent Vehicle Assistant

Figure 18:
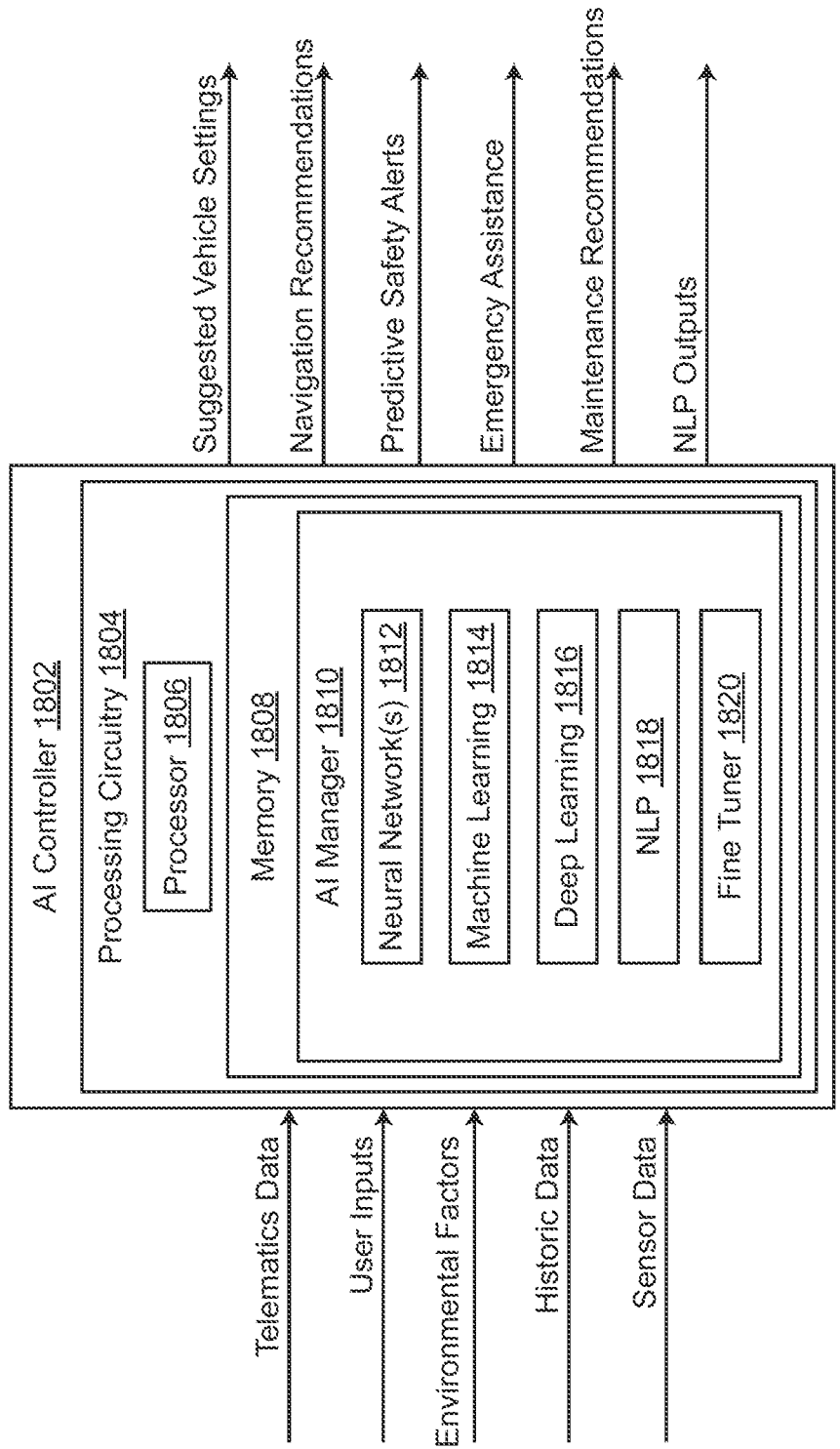
FIG. 18 is a block diagram of an artificial intelligence (AI) controller and manager of the retrofit control unit of FIG. 1, according to some embodiments.
Figure 19:
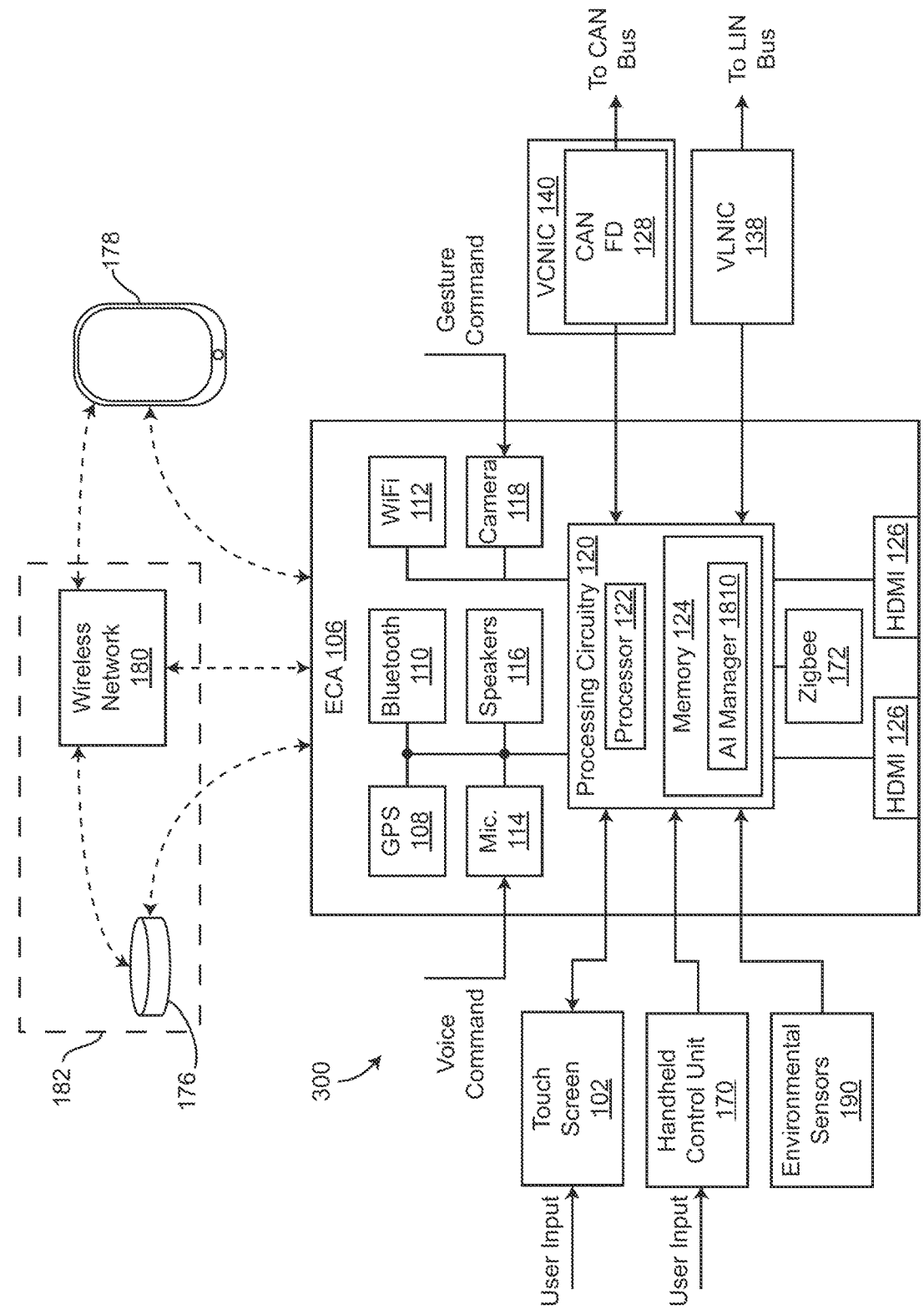
FIG. 19 is a block diagram of the control unit of FIG. 1 implementing the AI controller of FIG. 18, according to some embodiments.

Referring to FIGS. 18-19, the control unit 300 may be configured to implement an artificial intelligence (AI) controller 1802 as a part of the control unit 300, according to some embodiments. In various embodiments, the AI controller 1802 may be part of the ECA 106, separate from the ECA, or otherwise integrated with the other components of the control unit 300. The AI controller 1802 is configured to implement an advanced vehicle interactive control system that leverages advanced AI technology in order to enhance accessibility, convenience, user experience, diagnostics, mobility, reliability, and design optimization for vehicles in which the AI controller 1802 is installed (e.g., either in a manufacturing process of the vehicle 10 or being retrofit onto the vehicle 10 after the vehicle 10 has been manufactured). In some embodiments, the AI controller 1802 is configured to receive any data communications on the CAN bus 200 or the LIN bus 142 in order to perform various AI functionality. For example, the AI controller 1802 may be configured to receive, from various sensors, devices, detectors, sub-systems, sub-controllers, modules, etc., via the CAN bus 200, the LIN bus 142, or from one or more direct wired or wireless connections one or more signals indicative of telemetry (e.g., telematics) data, user inputs, external data, historical data, and sensor data.

Referring particularly to FIG. 18, the AI controller 1802 includes processing circuitry 1804 including a processor 1806 and memory 1808. Processing circuitry 1804 can be communicably connected to a communications interface such that processing circuitry 1804 and the various components thereof can send and receive data via the communications interface. Processor 1806 can be implemented as a general purpose processor, an application specific integrated circuit (ASIC), one or more field programmable gate arrays (FPGAs), a group of processing components, or other suitable electronic processing components.

Memory 1808 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1808 can be or include volatile memory or non-volatile memory. Memory 1808 can include database components, object code components, script components, or any other type of information structure for supporting the various activities and information structures described in the present application. According to some embodiments, memory 1808 is communicably connected to processor 1806 via processing circuitry 1804 and includes computer code for executing (e.g., by processing circuitry 1804 and/or processor 1806) one or more processes described herein. Although the processing circuitry 1804, processor 1806, and memory 1808 are shown as separate components in FIG. 18, it is contemplated that these and other components of the AI controller 1802 may be combined or integrated with the similarly named components of the ECA 106 (e.g., the processing circuitry 120, the processor 122, and the memory 124) in some embodiments.

The memory 1808 includes an AI manager 1810 that is configured to use the telematics data, the user inputs, the external data, the historic data, and the sensor data in order to determine one or more suggested or recommended vehicle settings, navigation or trip recommendations, predictive safety alerts, emergency assistance, and service/maintenance recommendations, according to some embodiments. The telematics or telemetry data may include real-time data including global position system (GPS) location, as well as sensor data. The sensor data may include real-time data from one or more sensors of the vehicle 10 including speed of the vehicle 10, acceleration of the vehicle 10, engine performance, fuel consumption or fuel level, and battery status (e.g., state of charge, voltage, state of health, etc., of a battery of the vehicle 10). If the vehicle 10 is an electric vehicle, the sensor data may be indicative of one or more operational characteristics of the vehicle 10. In some embodiments, the telematics data and the sensor data indicate current position (e.g., GPS location) and current status or performance of the vehicle 10.

The AI manager 1810 is configured to receive one or more user inputs and use the one or more user inputs to determine at least one of the suggested vehicle settings, the navigation recommendations, the predictive safety alerts, the emergency assistance, and the service/maintenance recommendations. In some embodiments, the user inputs are provided by the operator of the vehicle 10 via one or more modalities (e.g., steering inputs via a steering wheel, touch screen inputs via the touch screen 102, one or more button presses, shifter selections, etc.). The user inputs may include, but are not limited to, touch commands, voice commands, gestures by the operator, or other interactions with an interface (e.g., a human machine interface) of the vehicle 10. The user inputs may be provided via one or more pre-retrofit (e.g., vehicle manufacturer components) of the vehicle 10, or by one or more retrofit components of the control system 100 (e.g., the microphone 114, the camera 118, the touch screen 102, the handheld control unit 170, etc.). In some embodiments, the user inputs may indicate user preferences, settings, or requests that are used by the AI manager 1810 in order to determine the suggested vehicle settings, the navigation recommendations, the predictive safety alerts, the emergency assistance, and/or the service/maintenance recommendations. In some embodiments, one or more of the user inputs are provided and used by the AI manager 1810 in real-time. In some embodiments, one or more of the user inputs are provided as settings that are configured to be used over a future time period by the AI manager 1810. In some embodiments, the user inputs are used by the AI manager 1810 in order to determine personalized recommendations (e.g., personalized suggested vehicle settings, personalized navigation recommendations, personalized predictive safety alerts, personalized emergency assistance, personalized maintenance recommendations, etc.).

The AI manager 1810 is also configured to receive one or more external data (e.g., environmental factors such as temperature, humidity, weather forecasts, weather predictions, or other external data such as road conditions, traffic congestion, time of day, etc.), according to some embodiments. The external data may be obtained from a variety of sources including one or more environmental sensors 190 of the vehicle 10 (e.g., pre-retrofit components or retrofit components) such as temperature sensors, humidity sensors, camera vision systems (e.g., to determine a road condition). The external data may also be obtained from a traffic or map system via communications between the ECA 106 and the user device 178, communications between the ECA 106 and a cloud computing system or mobile application service (e.g., Google Maps). In some embodiments, external data obtained from the traffic or map system are obtained by pairing with the user device 178 and obtaining wireless or wired data from a mobile application of the user device 178 (e.g., in order to configure the user device 178 to communicate with one or more remote computing systems of mobile application service providers). In some embodiments, the external data obtained from the traffic or map system are obtained via the GPS 108, the Bluetooth module 110, the WiFi module 112 (e.g., to facilitate Internet connectivity), the Zigbee module 172, or the HDMI ports 126 which may be communicably coupled with one or more external or remote computing systems (e.g., servers) that implement map or traffic tracking systems. In some embodiments, the AI manager 1810 is configured to obtain time of day and/or date as one of the external data. The time of day and/or date may be obtained from a clock of the control system 100 or a clock of the vehicle 10. In some embodiments, the AI manager 1810 is configured to record an amount of driving time, and in combination with the time of day, determine or predict driver fatigue.

The AI manager 1810 may also receive one or more of any of the above mentioned external data from various sensors, systems, devices, communications or telemetry systems, etc., of the vehicle 10 via communicability between the AI controller 1802 and the CAN bus 200 or the LIN bus 142. It should be understood that any of the sensors, systems, etc., described herein that may be sources of the external data may be devices that are installed on the CAN bus 200 or the LIN bus 142.

The AI manager 1810 is also configured to obtain the historic data, according to some embodiments. In some embodiments, the historic data include historical data of any sensors, systems, controllers, microcontrollers, devices, etc., of the vehicle 10 (e.g., of the control system 100, the CAN bus 200, the LIN bus 142, etc.). In some embodiments, the historic data includes past driving patterns (e.g., acceleration patterns, braking patterns or characteristics, detected following distance between the vehicle 10 and a vehicle in front, common routes, etc.), previous or current user preferences (e.g., in-cabin temperature settings, seat positions, suspension settings, etc.), and vehicle performance data (e.g., fuel efficiency, tire pressure, detected error codes, braking capacity, fuel capacity, emissions data, acceleration abilities, top speed, throttle position, engine speed, timing advance, etc.). The AI controller 1802 may use the historic data of the vehicle 10 in order to identify patterns, trends, or characteristic operating conditions, settings, preferences, driving habits, common routes, etc., of the vehicle 10. The historic data may be stored within a database of the AI controller 1802 (e.g., in the memory 1808), in a remote data base, in a database or memory of the user device 178, etc.

The AI manager 1810 is also configured to obtain the sensor data, according to some embodiments. The sensor data may be any data obtained from sensors of the vehicle 10 (e.g., retrofit sensors of the control system 100 or pre-retrofit components of the vehicle 10 such as sensors that are installed on the CAN bus 200 and/or the LIN bus 142). In some embodiments, the sensor data includes exterior environmental condition data (e.g., external weather data such as temperature, humidity, brightness levels, etc.), interior environmental condition data (e.g., temperature data of an area within the vehicle 10), wheel or vehicle speed, a currently selected gear, tachometer data, engine speed, transmission speed, interior or exterior image data, interior or exterior audio data, etc.

The AI manager 1810 includes one or more neural networks 1812, one or more machine learning modules 1814, and/or one or more deep learning modules 1816, according to some embodiments. In some embodiments, the AI manager 1810 is configured to use a variety of different types and instantiations of neural networks, machine learning techniques, deep learning techniques, etc. The AI manager 1810 is configured to use the neural networks 1812, the machine learning 1814, and/or the deep learning 1816 in order to generate or output the suggested vehicle settings, the navigation recommendations, the predictive safety alerts, the emergency assistance, and/or the service/maintenance recommendations based on the input data that includes one or more of the telematics data, the user inputs, the external data, the historic data, and/or the sensor data. In some embodiments, any of the outputs of the AI manager 1810 (e.g., the suggested vehicle settings, the navigation recommendations, the predictive safety alerts, the emergency assistance, and the maintenance recommendations) are provided to the user according to different modalities or by different output devices such as via speakers 116, the touch screen 102, alert lights, a pre-retrofit display screen of the vehicle 10, etc.

In some embodiments, the navigation recommendations include trip or route suggestions such as suggesting that the driver of the vehicle 10 take a break. In some embodiments, the AI manager 1810 is configured to use the driver fatigue in order to suggest a break or rest when the predicted driver fatigue reaches a threshold level. The AI manager 1810 can also suggest locations along a route for rest breaks, or predictively and proactively schedule rests on the driver's route (e.g., based on estimated travel time, identify a predicted future driver fatigue level or score at a future point along the driver's route, and prompt the user to schedule a break or rest at the future point along the driver's route). The navigation recommendations may be determined by the AI manager 1810 based on factors such as weather conditions, traffic congestion, and driver fatigue in order to suggest rest breaks during long drives or to adjust navigation routes to avoid heavy traffic areas or roads. In some embodiments, the AI manager 1810 facilitates context-aware assistance in order to provide timely assistance and recommendations (e.g., break recommendations, route recommendations, etc.). In some embodiments, the driver fatigue is predicted by the AI manager 1810 by prompting the user (e.g., by providing a question to the user via the speaker 116) to provide an estimated or score of a subjective tiredness of the driver to the AI manager 1810 (e.g., operating the speakers 116 to ask the driver "Are you getting tired?" or "How are you feeling?").

Referring still to FIG. 18, the AI manager 1810 is configured to generate the suggested vehicle settings using the neural networks 1812, the machine learning module 1814, and/or the deep learning module 1816 based on the user inputs or historic data (e.g., user inputs) and based on the external data (e.g., weather conditions, road conditions, etc.). For example, the AI manager 1810 may suggest adjustments to climate control settings of the vehicle 10 (e.g., the AC 154, an amount of heat provided into the cabin or interior of the vehicle, etc., in order to achieve a desired temperature) based on user preferences of climate control settings correlated with the external data (e.g., outdoor temperature, outdoor humidity, outdoor brightness levels, weather forecasts, etc.). For example, the neural networks 1812, the machine learning module 1814, and/or the deep learning module 1816 may be trained or fine-tuned based on historic user preferences or user selections of the climate control settings as well as corresponding external data (e.g., outdoor temperature, outdoor humidity, outdoor brightness levels, etc.). The AI manager 1810 may be configured to predict climate settings for a climate control system of the vehicle 10 based on current external data (e.g., current outdoor temperature, current outdoor humidity, and current outdoor brightness levels) in accordance with the historic user preferences or user selections for the climate control settings at comparable external data. In this way, the AI manager 1810 can learn user preferences for climate settings for given external data or conditions and automatically provide the suggested climate settings to the user to prompt updating climate control systems to operate according to the suggested vehicle settings or can automatically implement the suggested climate control settings.

The AI manager 1810 may similarly provide suggested vehicle settings such as seat positions, according to some embodiments. In some embodiments, one or more seats of the vehicle 10 are controllable by the AI controller 1802. In some embodiments, a position of the seats and a relative orientation between a seat pan and a seat back is detectable and controllable by the AI controller 1802. In some embodiments, the AI manager 1810 is configured to record or learn a user's preferences for seat position and orientation, and can detect if current seat settings deviate from the user's preferences. The AI manager 1810 may provide suggested seat settings (e.g., forwards and rearwards position of the seat towards or away from the steering wheel, vertical position of the seat, relative orientation between the seat pan and the seat back) as one of the suggested vehicle settings in order to prompt an occupant of the vehicle 10 to change the position and/or orientation of the seat, or to automatically change the position and/or orientation of the seat to the user's preferences.

The AI manager 1810 may also provide suggested vehicle settings including suspension settings in order to enhance overall driving experience for occupants of the vehicle 10. In some embodiments, the suspension settings include changes to pressurization of hydraulic components of a suspension system of the vehicle 10 (e.g., adjusting the position of a valve or hydraulic pressurization of the suspension system). In some embodiments, the adjustments to the suspension settings include adjusting a ride height of the vehicle 10, an amount of damping provided by the suspension system of the vehicle 10, etc. In some embodiments, the AI manager 1810 is configured to determine the suggested suspension settings based on road conditions obtained as a portion of the external data or the sensor data. For example, the road conditions may indicate a bumpiness of a road or surface upon which the vehicle 10 is currently traveling, a degree of moisture on the road, whether construction is being performed on the road, etc. In some embodiments, the AI manager 1810 is configured to use the neural networks 1812, the machine learning module 1814, and/or the deep learning module 1816 to predict optimal suggested suspension settings in order to improve performance of the vehicle 10 and to improve ride comfortability for the occupants of the vehicle 10.

In some embodiments, the suggested vehicle settings include optimization of fuel consumption by adaptive driving behavior (e.g., changing engine speed, switching gears, changing throttle position, initiating regenerative braking if available, etc.). In some embodiments, the suggested vehicle settings include automatic activation of adaptive cruise control in order to maintain a minimum following or leading distance from a vehicle in front of or behind the vehicle 10 (e.g., based on image or distance data obtained from external sensors of the vehicle 10). In some embodiments, the AI manager 1810 optimizes vehicle functions in real-time by continuously analyzing any of the input data (e.g., vehicle data, user inputs, external data, etc.) to determine efficient and comfortable settings for the vehicle 10.

The AI manager 1810 can also be configured to provide navigation recommendations to the user in order to optimize a route taken by the vehicle 10 during driving. In some embodiments, the AI manager 1810 is configured to notify and operate the touch screen 102 or a display screen in the vehicle 10 to provide the driver or occupants of the vehicle 10 regarding alternative routes that the driver may take in order to avoid road closures, avoid traffic, avoid roads with poor quality, etc. The AI manager 1810 is configured to determine the navigation recommendations based on real-time traffic data, road conditions, and user preferences. In some embodiments, the AI manager 1810 is configured to provide navigation recommendations to the driver of the vehicle 10 also based on user preferences (e.g., avoid traffic, avoid poor road quality, get to destination as quickly as possible, use freeways, avoid freeways, etc.).

The AI manager 1810 is also configured to provide predictive safety alerts to the driver of the vehicle 10, according to some embodiments. In some embodiments, the predictive safety alerts are generated or predicted by the AI manager 1810 using any of the inputs. The predictive safety alerts may include alerts or warnings for the driver of the vehicle 10 to notify the driver of the vehicle 10 regarding potential hazards or risks such as sudden braking of a vehicle in front of the vehicle 10, slippery or poor road conditions, upcoming construction zones, upcoming speed limit changes, etc. In some embodiments, the AI manager 1810 uses real-time input data (e.g., real-time external data, telematics data, and sensor data) in order to preemptively generate and provide the predictive safety alerts to the driver or occupants of the vehicle 10. The AI manager 1810 may provide predictive or proactive safety alerts including but not limited to, providing the driver with warning and recommendations to change a route of travel in order to avoid emergencies or dangerous situations. The predictive or proactive safety alerts may also include alerts notifying the occupants of the vehicle 10 regarding road conditions, traffic congestion, weather changes, or other relevant factors.

The AI manager 1810 is also configured to initiate emergency assistance for the driver or occupant of the vehicle 10 by providing emergency assistance outputs to one or more emergency assistance systems or to display emergency assistance data to the occupants of the vehicle 10, according to some embodiments. In some embodiments, the AI manager 1810 is configured to (i) detect an emergency situation of the vehicle 10, and (ii) responsive to detecting the emergency situation, initiate emergency assistance for the occupants of the vehicle 10. The emergency situations of the vehicle 10 may include low fuel levels, detected collisions, detected airbag deployment, excessively high speeds, etc. In some embodiments, the AI manager 1810 is configured to use the sensor data to detect the emergency situation. The emergency assistance can include various automated actions such as communicating with emergency services to facilitate swift and appropriate responses, providing a location of the vehicle 10 to emergency services, placing a phonecall to an emergency or roadside assistance service and allowing the driver or occupants of the vehicle 10 to speak with emergency personnel via the speakers 116 and the microphone 114, etc. In some embodiments, the emergency assistance includes providing step-by-step instructions to the occupants of the vehicle 10 (e.g., instructions to change a tire, instructions to call a roadside service, etc.). In some embodiments, the AI manager 1810 is configured to use one or more communications modules in order to establish direct communications between the vehicle 10 and emergency services or emergency personnel. The AI manager 1810 may relay information to the emergency services or emergency personnel including location of the vehicle 10, status of the vehicle 10, emergency situation details, etc., in order to facilitate appropriate and efficient emergency assistance. In some embodiments, the AI manager 1810 is configured to control operation of a telematics unit of the vehicle 10 (which may be a pre-retrofit or a retrofit component of the vehicle 10), a vehicle occupant's smartphone or cellular communications device (e.g., the user device 178), a cellular transceiver, a WiFi module 112, a radio transceiver, etc., in order to establish communications with the emergency personnel or emergency service.

The AI manager 1810 is also configured to provide maintenance recommendations to the driver or occupants of the vehicle 10, according to some embodiments. In some embodiments, the maintenance recommendations include maintenance tasks (e.g., change oil, service tires, add air to tires, replace transmission fluid, etc.), service intervals (e.g., take vehicle 10 to be serviced), or to alert the driver of the vehicle 10 that one or more potential issues may require immediate attention, thereby improving vehicle reliability and performance. In some embodiments, the AI manager 1810 is configured to determine the maintenance recommendations based on the telematics data, the historic data (e.g., historic performance), and/or diagnostic data (e.g., error codes, check engine codes, diagnostic trouble codes, etc.).

Referring still to FIG. 18, the AI manager 1810 includes a natural language processor (NLP) 1818, according to some embodiments. In some embodiments, the NLP 1818 is configured to facilitate hands-free communications between the driver or occupant of the vehicle 10 and the AI manager 1810. In some embodiments, the user inputs can be provided as spoken words or phrases that are obtained by the microphone 114 and transmitted to the NLP 1818. The NLP 1818 may use signals obtained by the microphone 114 in order to identify requests or inputs from the user, and provide the requests or inputs from the user to the neural networks 1812, the machine learning module 1814, and/or the deep learning module 1816 in order to generate appropriate outputs according to the request or input from the user. In some embodiments, the NLP 1818 is also configured to provide output signals (e.g., responses), shown as NLP outputs which can be used by the speakers 116 to provide responses to the driver, user, or occupant of the vehicle (e.g., confirmations that the request or input from the user has been received and is being implemented, asking confirmation to adjust a setting or implement an output, etc.). In some embodiments, the NLP 1818 is also configured to implement or use a large language model (LLM) AI in order to facilitate obtaining spoken user inputs in a conversational manner with the AI manager 1810 (e.g., to obtain user inputs according to a spoken modality and provide responses according to the spoken modality). In some embodiments, the NLP 1818 is configured to facilitate receiving voice commands from the driver, user, or occupant of the vehicle 10, receive voice commands to seek assistance by the AI manager 1810, and/or to provide information or outputs to the user, driver, or occupant of the vehicle 10 audibly.

The AI manager 1810 also includes a fine tuner 1820, according to some embodiments. In some embodiments, the fine tuner 1820 is configured to initiate a tuning or fine-tuning process or adjustment of the neural networks 1812, the machine learning implemented by the machine learning module 1814, and/or the deep learning implemented by the deep learning module 1816. In some embodiments, the fine tuner 1820 is configured to obtain and store any of the telematics data, the user inputs, the external data, and the sensor data in a time-series manner and intermittently initiate the tuning or fine-tuning process of the neural networks 1812, the machine learning, or the deep learning. In some embodiments, the fine tuner 1820 initiates the fine tuning process at scheduled intervals (e.g., during the night, once a week, once a month, etc.) when the vehicle 10 is typically not in use. In some embodiments, any of the outputs of the AI manager 1810 can also be used in the tuning or fine-tuning process of the neural networks 1812, the machine learning, or the deep learning. In some embodiments, the AI manager 1810 continuously learns and adapts over time due to the tuning or fine-tuning process in order to continuously improve the outputs of the AI manager 1810 to tailor the functioning of the AI manager 1810 to the user's preferences. By analyzing user feedback, monitoring driving patterns, incorporating new data, and performing various fine-tuning or adjustment processes, the AI manager 1810 becomes more accurate and responsive over time, thereby providing increasingly personalized and helpful feedback to the user of the vehicle 10. Advantageously, the AI manager 1810 can also facilitate improved insight for the driver, user, or owner of the vehicle 10, technicians, and vehicle manufacturers. In some embodiments, data collected by or settings (e.g., parameters, weights, etc.) of the neural networks 1812, the machine learning module 1814, and the deep learning module 1816 may be downloaded from the AI controller 1802 or the AI manager 1810 (e.g., via a communications port, Bluetooth communications, or the user's mobile phone) to facilitate improved design feedback or service feedback for vehicle manufacturers and service technicians. In this way, the AI manager 1810 may also be beneficial to the owner of the vehicle 10 by improving the accuracy with which a technician can identify issues or malfunctioning of the vehicle 10.

Referring to FIG. 19, the AI manager 1810 and any of the functionality of the AI controller 1802 as described in greater detail above with reference to FIG. 18 may be incorporated in the processing circuitry 120 of the ECA 106, according to some embodiments. In this way, any of the functions of the AI manager 1810 including required hardware (e.g., sensors, telematics units, transceivers, etc.) may be retrofit onto the vehicle 10 as retrofit AI system 1900. In some embodiments, the AI manager 1810 is installed on a vehicle manufacturer's control system of the vehicle 10 as part of a manufacturing process of the vehicle 10. The AI manager 1810 may be implemented on the processing circuitry 120 of the ECA 106 and can be configured to use any of the functionality of the ECA 106 or the control system 100 as described in greater above in order to implement the functionality of the AI manager 1810 (e.g., obtain the inputs and/or provide the outputs according to different modalities).

Figure 20:
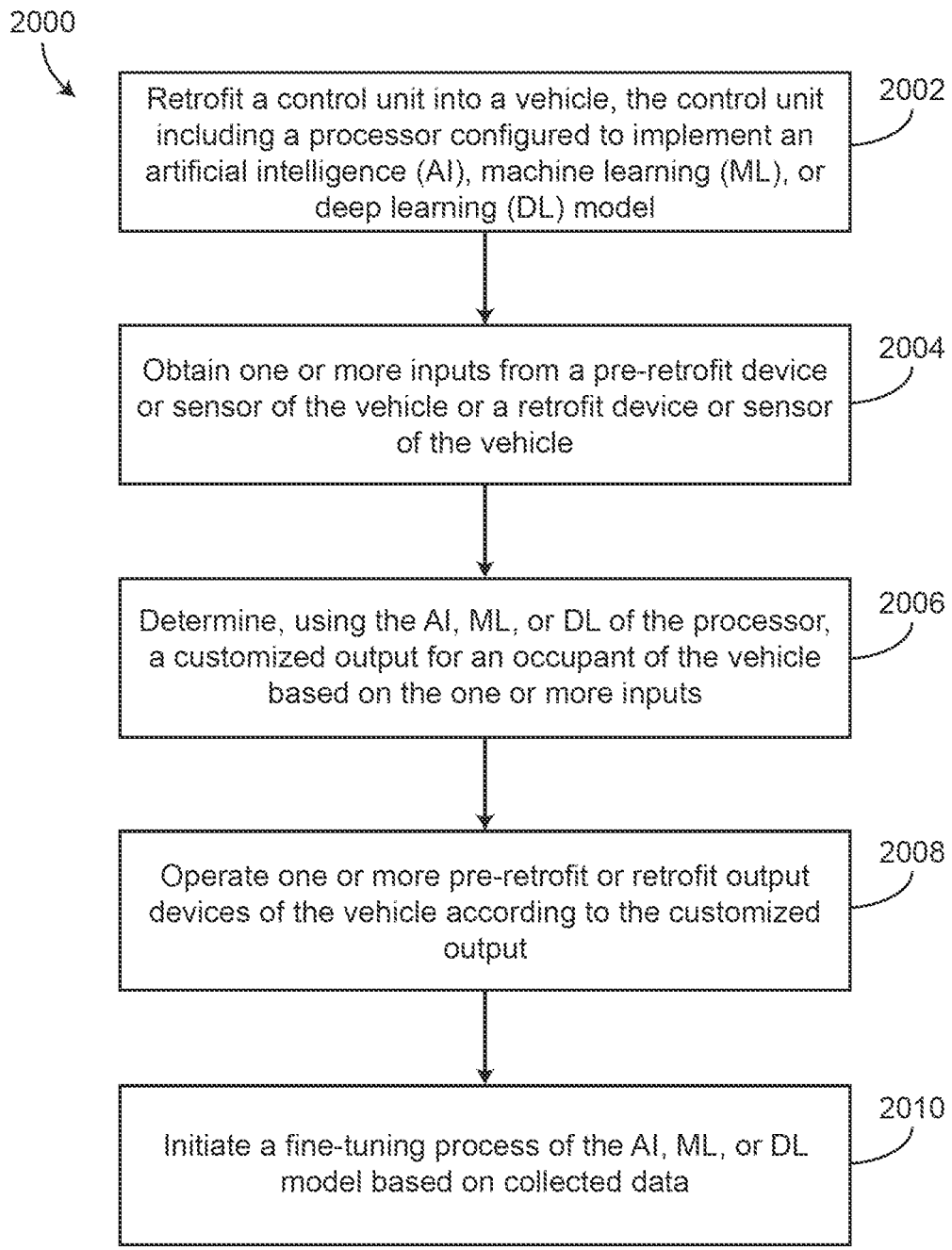
FIG. 20 is a flow diagram of a process for retrofitting and using a smart or AI assistant on a vehicle, according to some embodiments.

Referring to FIG. 20, a flow diagram of a process 2000 for retrofitting or installing the AI manager 1810 onto a vehicle includes steps 2002-2010, according to some embodiments. In some embodiments, the process 2000 is performed similarly to the process 400 as described in greater detail above with reference to FIG. 4. For example, the installation steps of the process 2000 may be performed in order to retrofit a control system onto a vehicle to thereby enable various smart functionality for the vehicle, even if the vehicle as provided by a manufacturer lacks smart functionality.

The process 2000 includes retrofitting a control unit into a vehicle, the control unit including a processor configured to implement an artificial intelligence (AI), machine learning (ML), or deep learning (DL) model (step 2002), according to some embodiments. In some embodiments, step 2002 is performed the same as or similar to the step 402 of the process 400. In some embodiments, the control unit is the ECA 106 which is configured to implement the AI manager 1810 on processing circuitry thereof. In some embodiments, retrofitting the control unit into the vehicle includes communicably coupling the AI, the ML, or the DL model with a CAN bus or a LIN bus of the vehicle such that the AI, the ML, or the DL model can receive and send data with any components of the CAN bus or the LIN bus of the vehicle as well as devices or sensors that are pre-existing (e.g., pre-retrofit components of the CAN bus or the LIN bus of the vehicle) on the vehicle or retrofit to the vehicle in step 2002.

The process 2000 includes obtaining one or more inputs from a pre-retrofit device or sensor of the vehicle or a retrofit device or sensor of the vehicle (step 2004), according to some embodiments. In some embodiments, step 2004 is performed by the AI manager 1810. In some embodiments, the one or more inputs are obtained wirelessly such as via Bluetooth, ZigBee, Internet connectivity, or cellular connectivity. In some embodiments, the one or more inputs are obtained via the CAN bus or the LIN bus or via another communications bus or system that is installed in step 2002. In some embodiments, the one or more inputs include any of the inputs of the ECA as described in greater detail above with reference to FIGS. 1-17. In some embodiments, the one or more inputs include any of the telematics data, the user inputs, the external data, the historic data, and/or the sensor data as described in greater detail above with reference to FIG. 18. In some embodiments, the one or more user inputs are obtained according to different modalities such as via a touch screen, via button presses, via communications buses or systems, via a microphone of the control unit, etc. Step 2004 may be facilitated or prompted by operations of an NLP (e.g., the NLP 1818) such that one or more user inputs are obtained via spoken phrases and detected by the NLP using audio data or audio signals obtained from a microphone of the control unit.

The process 2000 includes determining, using the AI, ML, or DL model of the processor, a customized output for an occupant of the vehicle based on the one or more inputs (step 2006), according to some embodiments. In some embodiments, step 2006 is performed by the AI manager 1810, or more generally, by the processing circuitry 120 of the ECA 106 on which the AI manager 1810 is implemented. In some embodiments, step 2006 includes determining at least one of one or more suggested vehicle settings, one or more navigation recommendations, one or more predictive safety alerts, one or more emergency assistance actions, or one or more maintenance recommendations. In some embodiments, step 2006 is performed by providing the one or more inputs obtained at step 2004 to the AI, ML, or DL model.

The process 2000 includes operating one or more pre-retrofit or retrofit output devices of the vehicle according to the customized output (step 2008), according to some embodiments. In some embodiments, step 2008 is performed by the ECA 106 or by providing the outputs of the AI, ML, or DL model of the processor to appropriate devices, controllers, PLCs, etc., of the vehicle 10 (e.g., via the CAN bus of the vehicle 10, the LIN bus of the vehicle 10, etc.). In some embodiments, the pre-retrofit or retrofit output devices may be operated in order to adjust a driving or vehicle setting of the vehicle 10, notify the driver of the vehicle 10 regarding one or more navigation recommendations, provide predictive or proactive safety alerts, initiate emergency assistance, or provide one or more maintenance recommendations.

The process 2000 includes initiating a fine-tuning process of the AI, ML, or DL model based on collected data (step 2010), according to some embodiments. In some embodiments, step 2010 is performed by the fine tuner 1820 of the AI manager 1810. In some embodiments, step 2010 includes using historic data obtained by the AI manager 1810 over an operational time period of the vehicle 10. The historic data may indicate various patterns of operation of the vehicle 10 or preferences of the driver. In some embodiments, step 2010 is performed in order to tune the AI, ML, or DL model such that the AI, ML, or DL model generates outputs in accordance with a user's preferences. In some embodiments, step 2010 is performed intermittently, on a scheduled basis (e.g., once a month, every week, every night), or in response to a user input.

DAB Button

Figure 21:
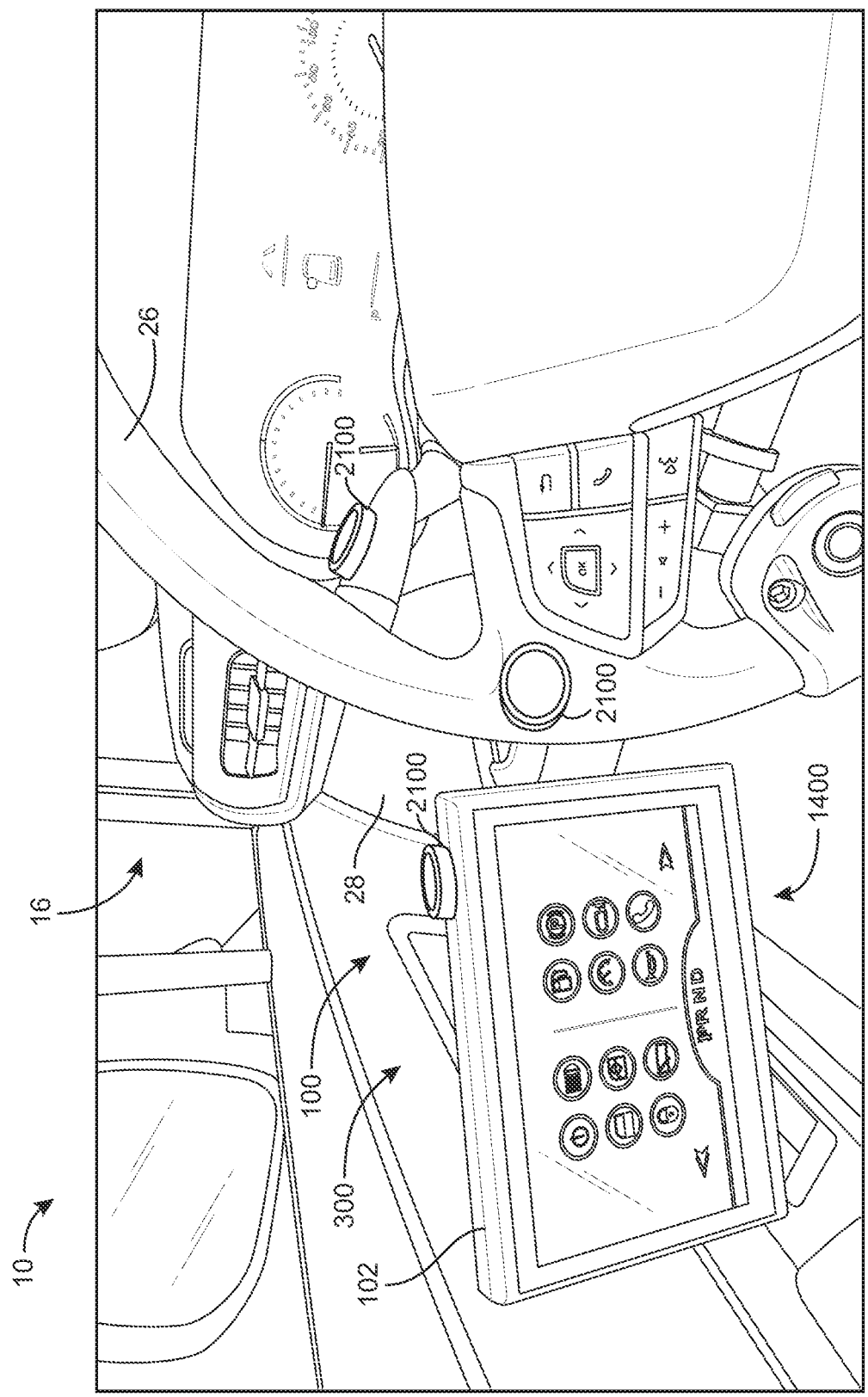
FIG. 21 is a diagram of a digital accessibility button (DAB) of the control unit of FIG. 1 retrofit onto a vehicle, according to some embodiments.

Referring to FIG. 21, the control system 100 may include a DAB 2100 installed within reach of the driver of the vehicle 10. The DAB 2100 is a retrofit input device (e.g., a button, a button set, multiple buttons, a switch, etc.) that can be installed in a variety of locations such that a driver with impaired fine motor skills may press the DAB 2100. For example, the DAB 2100 may be positioned on the touch screen 102, on the steering wheel 26, on a shifter or indicator lever, on a central console, on a dashboard, etc., of the vehicle 10. The DAB 2100 may be communicably coupled with the ECA 106 (e.g., wiredly communicably coupled) such that, when pressed, the ECA 106 receives an input that the DAB 2100 has been pressed.

Responsive to receiving the input that the DAB 2100 has been pressed, the ECA 106 may operate the speakers 116 to begin sequentially reciting a list of features while simultaneously operating the touch screen 102 to display corresponding icons. For example, the ECA 106 may operate the speakers 116 and the touch screen 102 to provide the list of features in both an aural and visual modality. The driver may select one of the features for adjustment by pressing the DAB 2100 again during a time period of the sequential recitation of the list of features associated with a desired feature. For example, the ECA 106 may be configured to identify a time at which a second user input is received and determine which feature of the list of features is being aurally and/or visually communicated to the user at the time at which the second user is received. The ECA 106 may select the particular feature for control and cause desired operation or adjustment of the particular feature. In some embodiments, the driver may then adjust the feature by being again provided with a recited list of adjustments to the features via the speakers 116 while simultaneously displaying corresponding icons. In some embodiments, the driver may similarly press the DAB 2100 again when presented with an adjustment to the feature desired by the driver. In some embodiments, the feature is adjusted or a function is performed responsive to the driver pressing the DAB 2100 during one of the time periods associated with a desired feature or function during the initial sequential recitation of the list of features (e.g., receive a third user input and identify a desired adjustment to the feature or function similarly to identification of the second user input as described above). The list of features or functions may include, but are not limited to, activate or deactivate a left indicator, activate or deactivate a right indicator, activate or deactivate head lights, activate or deactivate hazard flashers, activate the horn, activate, deactivate, or adjust a speed of windshield wipers, roll up or roll down a first window, roll up or roll down a second window, etc. Advantageously, the DAB 2100 is a retrofit component or input device of the control system 100 that facilitates single button operation of various pre-retrofit features of the vehicle 10.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A retrofit control system for a vehicle comprising:
    a display screen retrofit on the vehicle and configured to display an output;
    a function-specific programmable logic controller (PLC) configured to communicate with a Controller Area Network (CAN) bus of the vehicle;
    an embedded computer assembly (ECA) retrofit on the vehicle and comprising processing circuitry configured to:
        obtain one or more inputs from at least one pre-retrofit device or sensor and at least one retrofit device or sensor;
        determine, based on the one or more inputs and using an artificial intelligence (AI), a customized output for a user of the vehicle; and
        operate one or more pre-retrofit devices or retrofit devices of the vehicle according to the customized output;
    wherein the ECA is configured to suppress communications on the CAN bus from a pre-retrofit component and generate new communications on the CAN bus to at least partially operate the one or more pre-retrofit devices of the vehicle according to the customized output.

2. The retrofit control system of claim 1, wherein the customized output comprises a suggested vehicle setting including a suggested temperature setting for an interior of the vehicle, a suggested position of a seat of the vehicle, or a suggested suspension setting of the vehicle, the suggested vehicle setting being a personalized setting for the user determined based on one or more user preferences learned by the AI and determined based on one or more external conditions of the vehicle, the external conditions comprising exterior temperature, exterior humidity, or road quality.

3. The retrofit control system of claim 1, wherein the customized output comprises:
    a navigation recommendation comprising a suggested route for the user of the vehicle to reach a specific destination, the navigation recommendation determined by the AI based on real-time traffic data, road conditions, a current location of the vehicle, and user preferences;
    wherein operating the one or more pre-retrofit devices or retrofit devices of the vehicle according to the navigation recommendation comprises operating a pre-retrofit or retrofit display screen of the vehicle to display the navigation recommendation.

4. The retrofit control system of claim 1, wherein the customized output comprises:
    a predictive safety alert, the predictive safety alert configured to notify the user regarding a potential future hazard including at least one of a braking event of an external vehicle in front of the vehicle, poor road conditions, or upcoming traffic along a route of the vehicle, the predictive safety alert determined by the AI based on at least one of construction or road quality data obtained from an external service, or image data obtained from an imaging device of the vehicle;
    wherein operating the one or more pre-retrofit devices or retrofit devices of the vehicle according to the predictive safety alert comprises operating a pre-retrofit or retrofit display screen or speaker of the vehicle to provide a visual alert or an aural alert.

5. The retrofit control system of claim 1, wherein the customized output comprises:
- an emergency assistance output, the emergency assistance output comprising at least one of an automated action to notify an emergency service, or a plurality of instructions for the user, the automated action to notify the emergency service including establishing communications with the emergency service via a wireless transceiver and reporting a location and status of the vehicle to the emergency service.

6. The retrofit control system of claim 1, wherein the customized output comprises:
- a maintenance recommendation, the maintenance recommendation comprising a suggested maintenance task, a service interval, or an alert to the user regarding a potential malfunction of the vehicle that requires inspection, the maintenance recommendation determined by the AI based on telematics data, historical performance data of the vehicle, and diagnostic information of the vehicle;
- wherein operating the one or more pre-retrofit devices or retrofit devices of the vehicle according to the maintenance recommendation comprises operating a pre-retrofit or retrofit display screen or speaker of the vehicle to provide a visual alert or an aural alert.

7. The retrofit control system of claim 1, further comprising:
- a microphone configured to obtain audio data of spoken words by the user; and
- a speaker configured to operate to provide aural feedback to the user;
- wherein the ECA is configured to implement a natural language processor (NLP) to obtain a user input from the user via the microphone according to a spoken modality and operate the speaker to provide feedback to the user according to the spoken modality;
- wherein the NLP, the microphone, and the speaker are configured to enable operation of the ECA by the user in a conversational manner to allow hands-free interaction between the user and the ECA.

8. The retrofit control system of claim 1, wherein the processing circuitry is configured to:
- collect the one or more inputs over a time period; and
- use the collected one or more inputs to tune or train the AI in order to improve a customization of the customized output.

9. A method for providing and using an intelligent assistant on a vehicle, the method comprising:
- retrofitting a control unit into a vehicle, the control unit comprising an artificial intelligence (AI), the control unit configured to obtain input data from one or more pre-retrofit devices of a Controller Area Network (CAN) bus of the vehicle and from one or more pre-retrofit devices of a Local Interconnect Network (LIN) bus of the vehicle;
- obtaining one or more inputs from at least one of the pre-retrofit devices of the CAN bus of the vehicle or the pre-retrofit devices of the LIN bus of the vehicle, and from a retrofit device of the vehicle;
- determining, based on the one or more inputs and using the AI, a customized output for a user of the vehicle; and
- operating one or more pre-retrofit devices or retrofit devices of the vehicle according to the customized output;
- wherein the control unit is configured to suppress one or more communications on the CAN bus or the LIN bus and generate new communications on the CAN bus or the LIN bus to at least partially operate the one or more pre-retrofit devices of the vehicle according to the customized output.

10. The method of claim 9, wherein the customized output comprises a suggested vehicle setting including a suggested temperature setting for an interior of the vehicle, a suggested position of a seat of the vehicle, or a suggested suspension setting of the vehicle, the suggested vehicle setting being a personalized setting for the user determined based on one or more user preferences learned by the AI and determined based on one or more external conditions of the vehicle, the one or more external conditions comprising exterior temperature, exterior humidity, or road quality.

11. The method of claim 9, wherein the customized output comprises:
- a navigation recommendation comprising a suggested route for the user of the vehicle to reach a specific destination, the navigation recommendation determined by the AI based on real-time traffic data, road conditions, a current location of the vehicle, and user preferences;
- wherein operating the one or more pre-retrofit devices or retrofit devices of the vehicle according to the navigation recommendation comprises operating a pre-retrofit or retrofit display screen of the vehicle to display the navigation recommendation.

12. The method of claim 9, wherein the customized output comprises:
- a predictive safety alert, the predictive safety alert configured to notify the user regarding a potential future hazard including at least one of a braking event of an external vehicle in front of the vehicle, poor road conditions, or upcoming traffic along a route of the vehicle, the predictive safety alert determined by the AI based on at least one of construction or road quality data obtained from an external service, or image data obtained from an imaging device of the vehicle;
- wherein operating the one or more pre-retrofit devices or retrofit devices of the vehicle according to the predictive safety alert comprises operating a pre-retrofit or retrofit display screen or speaker of the vehicle to provide a visual alert or an aural alert.

13. The method of claim 9, wherein the customized output comprises:
- an emergency assistance output, the emergency assistance output comprising at least one of an automated action to notify an emergency service, or a plurality of instructions for the user, the automated action to notify the emergency service including establishing communications with the emergency service via a wireless transceiver and reporting a location and status of the vehicle to the emergency service.

14. The method of claim 9, wherein the customized output comprises:
- a maintenance recommendation, the maintenance recommendation comprising a suggested maintenance task, a service interval, or an alert to the user regarding a potential malfunction of the vehicle that requires inspection, the maintenance recommendation determined by the AI based on telematics data, historical performance data of the vehicle, and diagnostic information of the vehicle;
- wherein operating the one or more pre-retrofit devices or retrofit devices of the vehicle according to the maintenance recommendation comprises operating a pre-retrofit or retrofit display screen or speaker of the vehicle to provide a visual alert or an aural alert.

15. The method of claim 9, wherein at least one of the one or more inputs are spoken inputs by the user obtained from a microphone, wherein the method comprises using a natural language processor (NLP) to determine a user input as one of the one or more inputs based on data obtained from the microphone.

16. The method of claim 9, further comprising:
collecting the one or more inputs over a time period; and
using the collected one or more inputs to tune or train the AI in order to improve a customization of the customized output.

17. A retrofit control system for a vehicle, the retrofit control system comprising:
a retrofit button retrofit to the vehicle and physically positioned within reach of a driver of the vehicle;
a function-specific programmable logic controller (PLC) configured to communicate with a CAN bus of the vehicle;
a speaker positioned within the vehicle; and
an embedded computer assembly (ECA) retrofit on the vehicle and comprising processing circuitry configured to:
obtain a first user input from the driver via the retrofit button;
responsive to the first user input, operate the speaker to provide aural feedback to the driver indicating a list of features;
obtain a second user input from the driver via the retrofit button during a time period when a desired feature of the list of features is being aurally communicated to the user via the speaker; and
responsive to receiving the second user input, provide a control signal to the PLC via the CAN bus of the vehicle to perform a requested vehicle function corresponding to the desired feature according to the second user input by generating new communications on the CAN bus of the vehicle.

18. The retrofit control system of claim 17, wherein the retrofit button is positioned on a steering wheel of the vehicle.

19. The retrofit control system of claim 17, wherein the list of features include at least two of:
activation or deactivation of a left indicator;
activation or deactivation of a right indicator;
activation or deactivation of head lights;
activation or deactivation of hazard flashers;
activation of a horn;
a control of windshield wipers; and
a power window adjustment;
wherein the processing circuitry is configured to operate the speaker to sequentially provide aural feedback to the driver indicating the list of features.

20. The retrofit control system of claim 17, wherein the retrofit button is configured to enable the driver of the vehicle to select and operate a plurality of different functions of the vehicle via actuation of a single button.

* * * * *